United States Patent
Yamamoto et al.

(10) Patent No.: US 12,390,733 B2
(45) Date of Patent: Aug. 19, 2025

(54) STORAGE MEDIUM STORING GAME PROGRAM, GAME SYSTEM, GAME APPARATUS, AND GAME PROCESSING METHOD

(71) Applicant: NINTENDO CO., LTD., Kyoto (JP)

(72) Inventors: Naoya Yamamoto, Kyoto (JP); Hidemaro Fujibayashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 214 days.

(21) Appl. No.: 18/328,073

(22) Filed: Jun. 2, 2023

(65) Prior Publication Data
US 2023/0398451 A1 Dec. 14, 2023

(30) Foreign Application Priority Data

Jun. 13, 2022 (JP) .................................. 2022-095027

(51) Int. Cl.
*A63F 13/5378* (2014.01)
*A63F 13/5258* (2014.01)
*A63F 13/55* (2014.01)

(52) U.S. Cl.
CPC ...... *A63F 13/5378* (2014.09); *A63F 13/5258* (2014.09); *A63F 13/55* (2014.09)

(58) Field of Classification Search
CPC ................... A63F 13/5378; A63F 13/5258
See application file for complete search history.

(56) References Cited

U.S. PATENT DOCUMENTS

| | | | | |
|---|---|---|---|---|
| 5,122,801 A | * | 6/1992 | Hughes | H04K 3/827 342/13 |
| 2002/0198047 A1 | | 12/2002 | Hinami et al. | |
| 2004/0224739 A1 | * | 11/2004 | Yamada | A63F 13/52 463/1 |
| 2008/0227543 A1 | * | 9/2008 | Kawase | A63F 13/10 463/31 |
| 2012/0004017 A1 | | 1/2012 | Sakurai et al. | |
| 2018/0345147 A1 | * | 12/2018 | Okajima | A63F 13/332 |

OTHER PUBLICATIONS

Fortnite video game published by Epic games in 2017 as evidenced by Ali-A YouTube video "Launch Pad *Returns* to Fortnite Chapter 2! (New Update)"available at https://www.youtube.com/watch?v=D_vbtLbxBGc&t=306s. (Year: 2017)*
Mar. 1, 2024 Office Action issued in Japanese Patent Application No. 2022-095027, pp. 1-4 [machine translation included].

(Continued)

*Primary Examiner* — James S. McClellan
(74) *Attorney, Agent, or Firm* — Nixon & Vanderhye PC

(57) ABSTRACT

Displaying is performed based on a map image of an area in a first state including map information or a map image of an area in a second state not including the map information. When a first condition is satisfied at a first location on a ground field of a first ground area, a ground map of the first ground area and an airspace map of a first airspace area above the first location are changed from the second state to the first state. When the first condition is satisfied, a player character is moved from the first location to a second location in an airspace field of the first airspace area, and movement control based on a user's movement operation input is resumed after the movement to the second location.

20 Claims, 20 Drawing Sheets

(56) References Cited

OTHER PUBLICATIONS

World map and how to open the map in Genshin, [online], Nov. 17, 2020, http://www.rmt-spc.com/gamenews/gamenews3800.html [Searched on Feb. 26, 2024] pp. 1-5.
"The Legend of Zelda: Breath of the Wild", Explore Hyrule, [online], Nintendo of America Inc., internet <URL:https://www.zelda.com/breath-of-the-wild/features/>, Searched on Apr. 21, 2022, 11 pages.

\* cited by examiner

FIG. 14
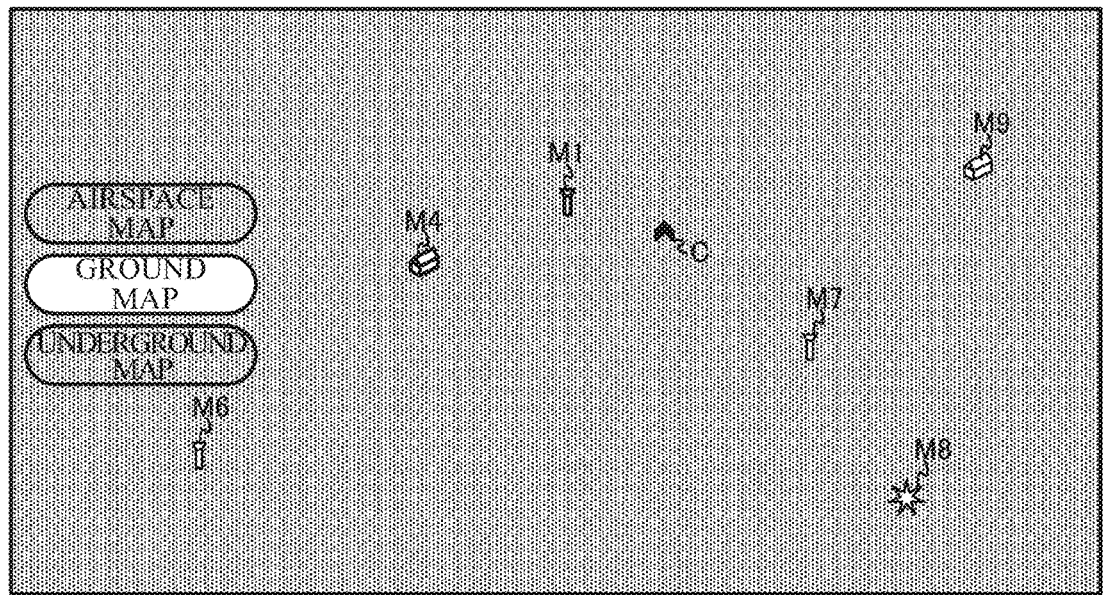
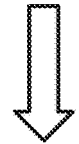
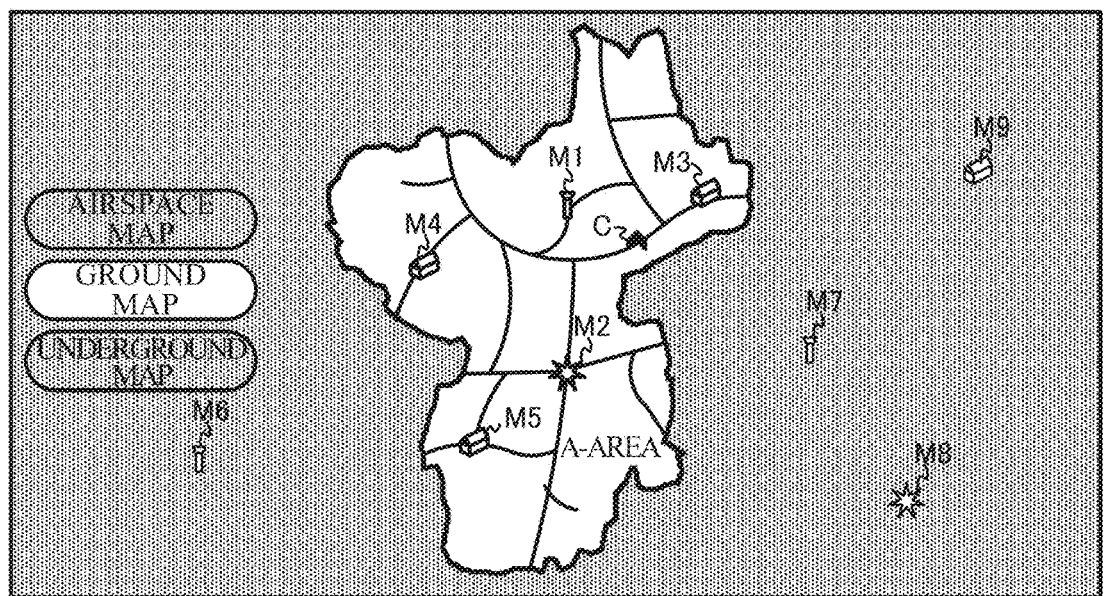

FIG. 15
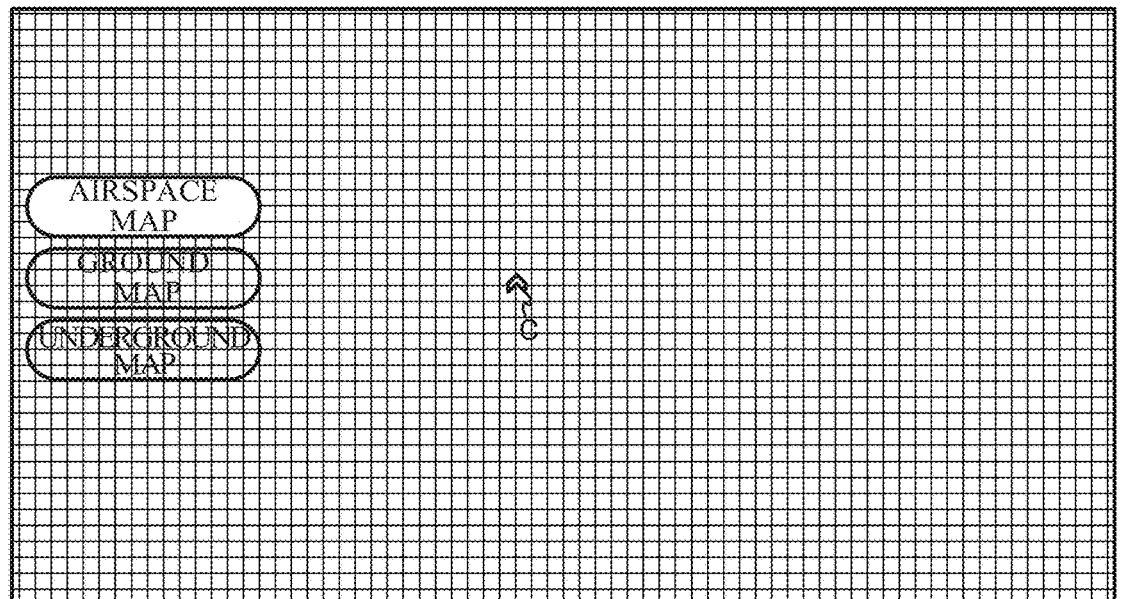
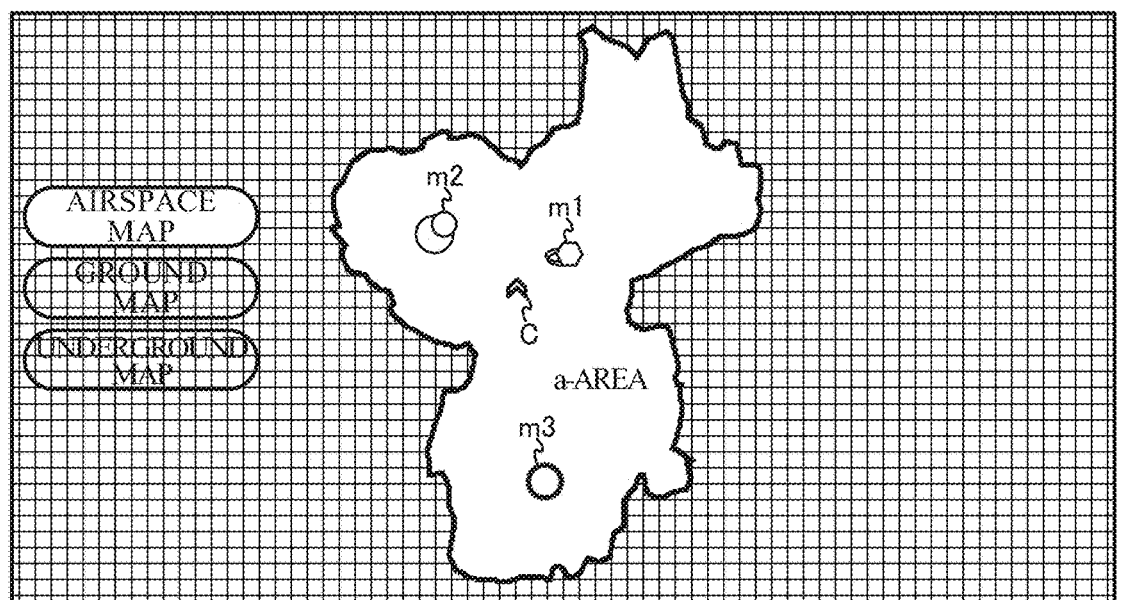

STORAGE MEDIUM STORING GAME PROGRAM, GAME SYSTEM, GAME APPARATUS, AND GAME PROCESSING METHOD

CROSS REFERENCE TO RELATED APPLICATION

This application claims priority to Japanese Patent Application No. 2022-95027, filed on Jun. 13, 2022, the entire contents of which are incorporated herein by reference.

FIELD

The technology disclosed herein relates to game program-storing storage media, game systems, game apparatuses, and game processing methods for executing a process using a player character in a virtual space.

BACKGROUND AND SUMMARY

There has conventionally been a game program that displays map information of a ground field in a virtual space. For example, in such a game program, when a player character visits a predetermined place in a virtual space, a locked map of a ground field is unlocked, so that details on the map can be browsed.

However, in the above game program, after the unlocking of the ground field map, the player character is only allowed to resume moving from the place where the player character has visited to unlock the map.

It is an object of the present example is to provide a game program-storing storage medium, game system, game apparatus, and game processing method for enabling a player character to more easily explore a virtual space.

To achieve the object, the present example may have features (1) to (9) below, for example.

(1) An example configuration of a non-transitory computer-readable storage medium having stored therein a game program according to the present example is executed by a computer of an information processing apparatus. The game program causes the computer to perform operations comprising: performing movement control of a player character in a virtual space including a ground field and an airspace field above the ground field, based on a user's movement operation input; displaying a map image for at least one of a ground map divided into a plurality of ground areas and indicating map information of the ground field and an airspace map divided into a plurality of airspace areas and indicating map information of the airspace field, based on a map image of an area in a first state including map information or a map image of an area in a second state not including the map information, according to the user's instruction operation input; when a first condition is satisfied at a first location on the ground field of a first ground area, changing the ground map of the first ground area and the airspace map of a first airspace area above the first location, from the second state to the first state; and when the first condition is satisfied, moving the player character from the first location to a second location in the airspace field of the first airspace area, and resuming the movement control based on the user's movement operation input after the movement to the second location.

According to the configuration of (1), the ground map and the airspace map are changed into the first state including map information, the player character is moved from the ground field to the airspace field, and the movement of the player character is resumed. Therefore, the user can more easily explore the airspace field and the ground field using the maps of the airspace field and the ground field.

(2) In the configuration of (1), the game program may further cause the computer to perform operations comprising: in a situation after the player character is moved from the first location to the second location, displaying a scene in which a ground map image of the first ground area in the first state and an airspace map image of the first airspace area in the first state are displayed, thereby allowing displaying of the first ground area and the first airspace area based on the map images in the first state; and resuming the movement control based on the movement operation input after end of the situation.

According to the configuration of (2), after the user browses the map information of the ground map and the airspace map, the movement control of the player character can be resumed from the airspace field. Therefore, the airspace field and the ground field can be even more easily explored.

(3) In the configuration of (1) or (2), virtual gravity may be set from an upward direction to a downward direction in the virtual space, and in the movement control after the resuming, the player character may be moved in the downward direction based on the gravity, and may be moved in a direction based on the user's movement operation input.

According to the configuration of (3), in addition to the downward movement based on the gravity in the virtual space, the movement control based on the user's movement operation input is allowed. Therefore, the airspace field and the ground field can be even more easily explored while browsing map information.

(4) In the configuration of any one of (1) to (3), the second location may be directly above the first location in the virtual space.

According to the configuration of (4), the movement control of the player character is resumed from the second location in the airspace field located directly above the first location on the ground field, and therefore, the location of the player character in the airspace field can be recognized with reference to the first location, so that the movement control of the player character can be resumed with reference to the first location. Therefore, the airspace field and the ground field can be more easily explored.

(5) In the configuration of any one of (1) to (4), the game program may further cause the computer to perform operations comprising: when the movement control is performed after the resuming, setting an imaging direction of a virtual camera to a direction pointing from the airspace field toward the ground field, and further displaying an image indicating the virtual space as viewed from the virtual camera.

According to the configuration of (5), after the action control is resumed in the airspace field, the virtual camera is controlled so as to image the ground field toward which the player character is moved. Therefore, a destination corresponding to map information shown in the ground map or the airspace map can be more easily recognized.

(6) In the configuration of any one of (1) to (5), one or more airspace field objects on which the player character is allowed to land may be disposed in the airspace field of the first airspace area, and a height of the second location may be higher than a height of at least one of the one or more airspace field objects in the virtual space.

According to the configuration of (6), after the movement control is resumed, the player character can be moved so as to land on an airspace field object disposed at a location lower than the second location.

(7) In the configuration of any one of (1) to (6), the game program may further cause the computer to perform operations comprising: if the ground map of the first ground area and the airspace map of the first airspace area have been changed into the first state, then when a second condition is satisfied at the first location, moving the player character from the first location to the second location again, and resuming the movement control based on the user's movement operation input after the movement to the second location.

According to the configuration of (7), even when map information is unlocked, the player character can be moved to the airspace field again, and the action control can be resumed. Therefore, the first location can serve as a base for exploration of the ground field and the airspace field.

(8) In the configuration of any one of (1) to (7), the game program may further cause the computer to perform operations comprising: when, during displaying of the map image, an instruction operation input for choosing a mark indicating the first location on the ground map is performed, moving the player character to a location in the virtual space indicted by the chosen mark.

According to the configuration of (8), the player character can be moved to the first location indicated by the ground map quickly from anywhere. In addition, the player character can also be moved from that first location to the second location in the airspace field. Therefore, the first location can serve as an exploration base for both of the ground field and the airspace field.

(9) In the configuration of any one of (1) to (8), the game program may further cause the computer to perform operations comprising: when a player character for which the movement control is allowed is located at a height or higher in the virtual space, displaying a portion of an image of the airspace map, or an image of the airspace map as a map image that is first displayed after start of displaying of the map image; and when a player character for which the movement control is allowed is located at less than the height in the virtual space, displaying a portion of an image of the ground map, or an image of the ground map as a map image that is first displayed after start of displaying of the map image.

According to the configuration of (9), a field where the player character is located can be more easily recognized. In addition, a map of a field where the player character is located can be displayed without switching maps between the ground map and the airspace map.

The present example may also be carried out in the form of a game system, game apparatus, and game processing method.

According to the present example, an airspace field and a ground field can be more easily explored using maps of the airspace field and the ground field.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 14 is a diagram illustrating a non-limiting example of locked and unlocked ground maps that are displayed when map information of an A-area region, of locked ground maps, FIG. 15 is a diagram illustrating a non-limiting example of locked and unlocked airspace maps that are displayed when map information of an a-area region is unlocked, of locked airspace maps.

DETAILED DESCRIPTION OF NON-LIMITING EXAMPLE EMBODIMENTS

A game system according to the present example will now be described. An example of a game system 1 according to the present example includes a main body apparatus (information processing apparatus serving as the main body of a game apparatus in the present example) 2, a left controller 3, and a right controller 4. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other (see FIG. 2). In the description that follows, a hardware configuration of the game system 1 of the present example is described, and thereafter, the control of the game system 1 of the present example is described.

Figure 1:
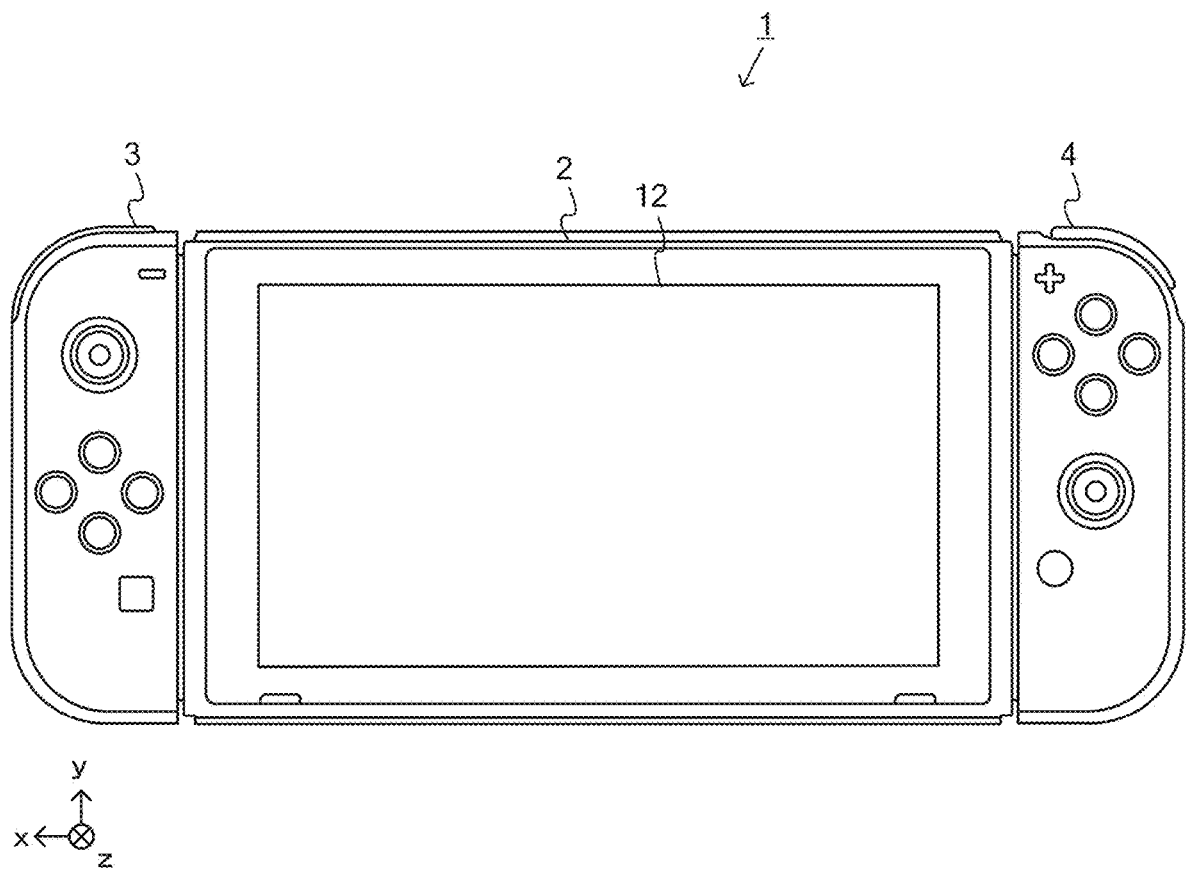
FIG. 1 is a diagram illustrating a non-limiting example of a state where a left controller 3 and a right controller 4 are attached to a main body apparatus 2.

FIG. 1 is a diagram illustrating an example of the state where the left controller 3 and the right controller 4 are attached to the main body apparatus 2. As illustrated in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
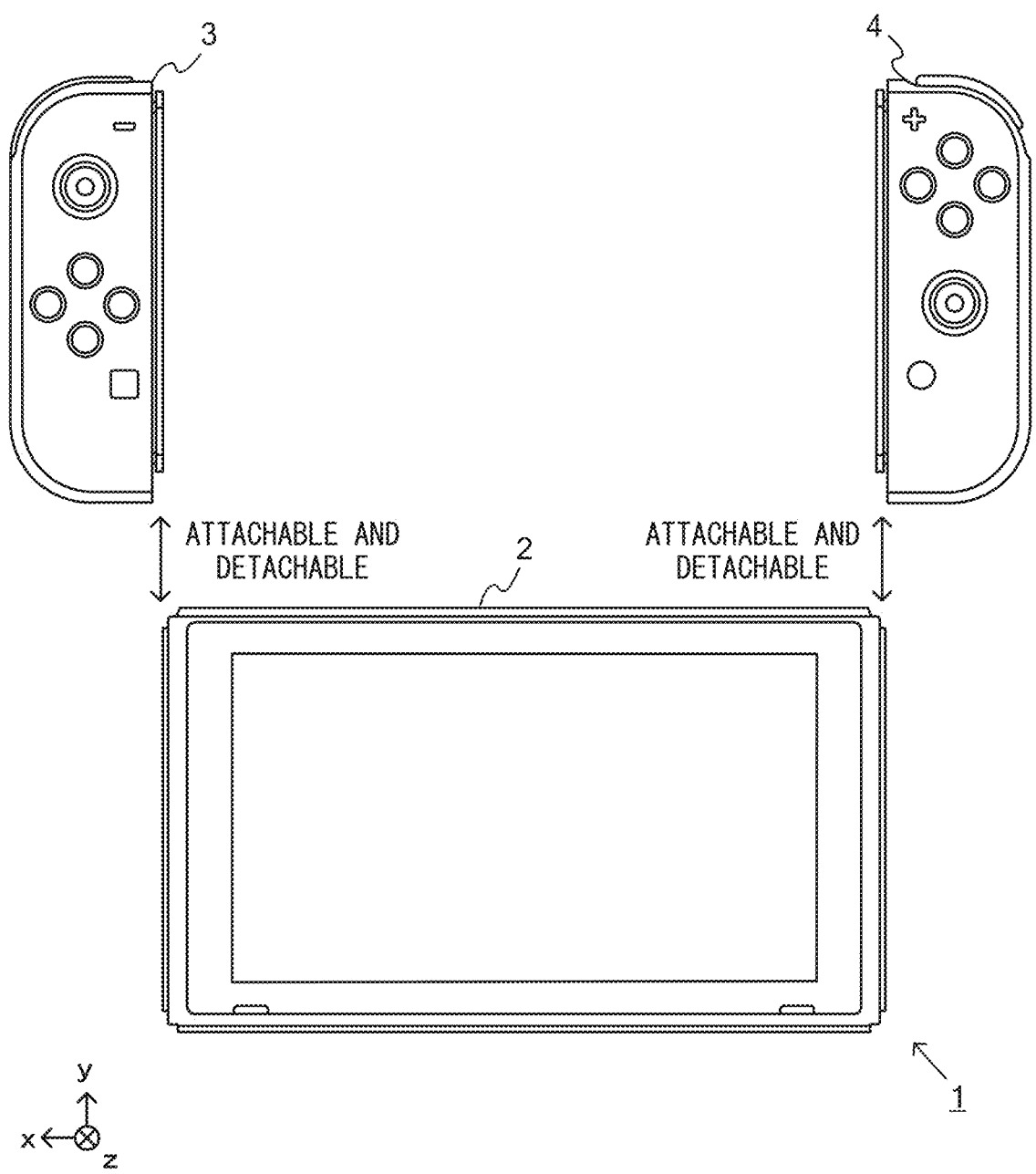
FIG. 2 is a diagram illustrating a non-limiting example of a state where a left controller 3 and a right controller 4 are detached from a main body apparatus 2.

FIG. 2 is a diagram illustrating an example of the state where each of the left controller 3 and the right controller 4 is detached from the main body apparatus 2. As illustrated in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
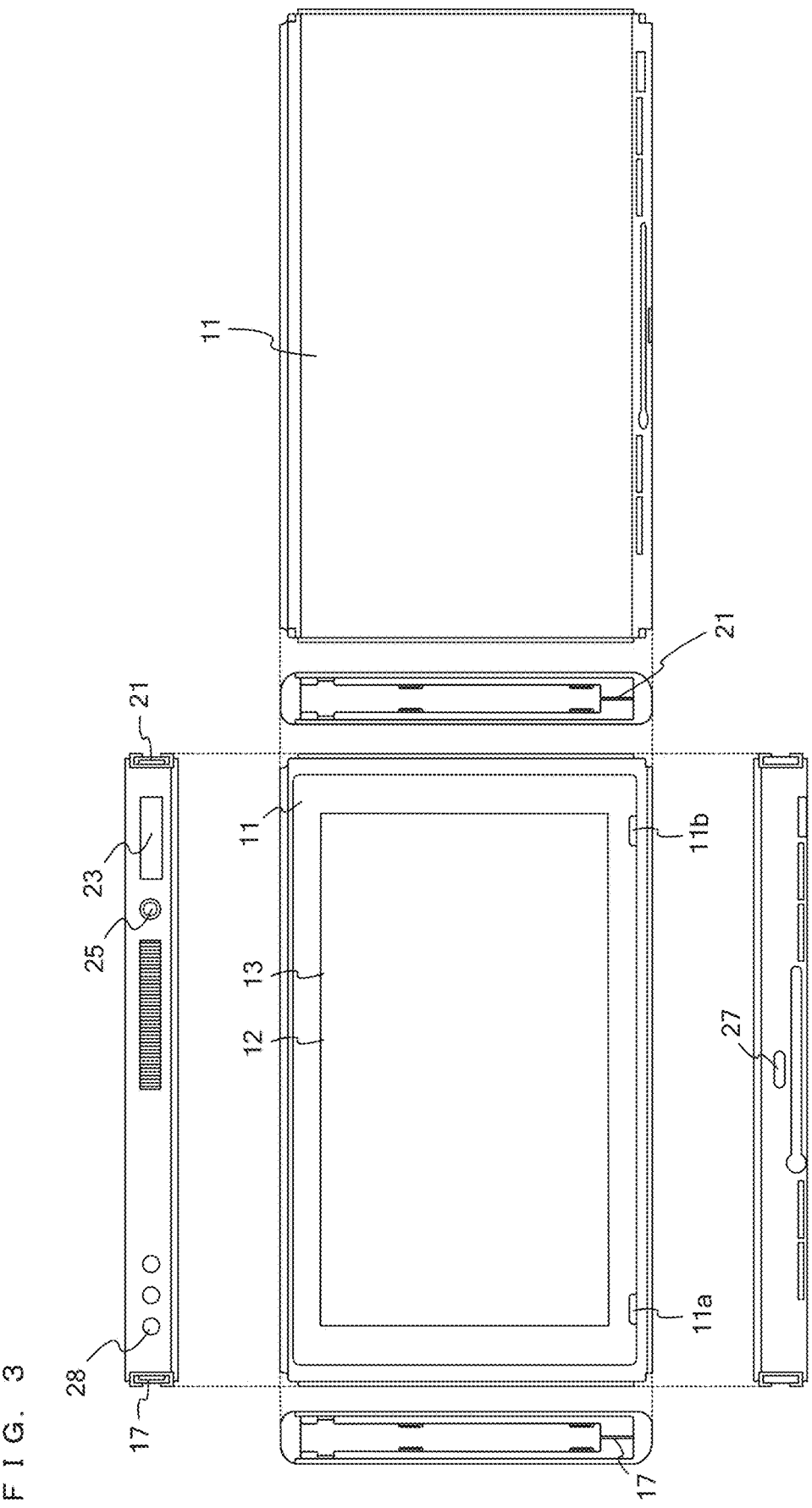
FIG. 3 illustrates six orthogonal views of a non-limiting example of a main body apparatus 2.

FIG. 3 illustrates six orthogonal views of an example of the main body apparatus 2. As illustrated in FIG. 3, the main body apparatus 2 includes an approximately plate-shaped housing 11. In the present example, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As illustrated in FIG. 3, the main body apparatus 2 includes the display 12, which is provided on the main surface of the housing 11. The display 12 displays an image generated by the main body apparatus 2. In the present example, the display 12 is a liquid crystal display device (LCD). The display 12, however, may be a display device of any suitable type.

In addition, the main body apparatus 2 includes a touch panel 13 on the screen of the display 12. In the present example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 illustrated in FIG. 6) inside the housing 11. As illustrated in FIG. 3, speaker holes 11a and 11b are formed in the main surface of the housing 11. The speaker 88 outputs sounds through the speaker holes 11a and 11b.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As illustrated in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In the present example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in the present example, the cradle has the function of charging the unified apparatus or the main body apparatus 2 alone, being placed thereon. The cradle also functions as a hub device (specifically, a USB hub).

Figure 4:
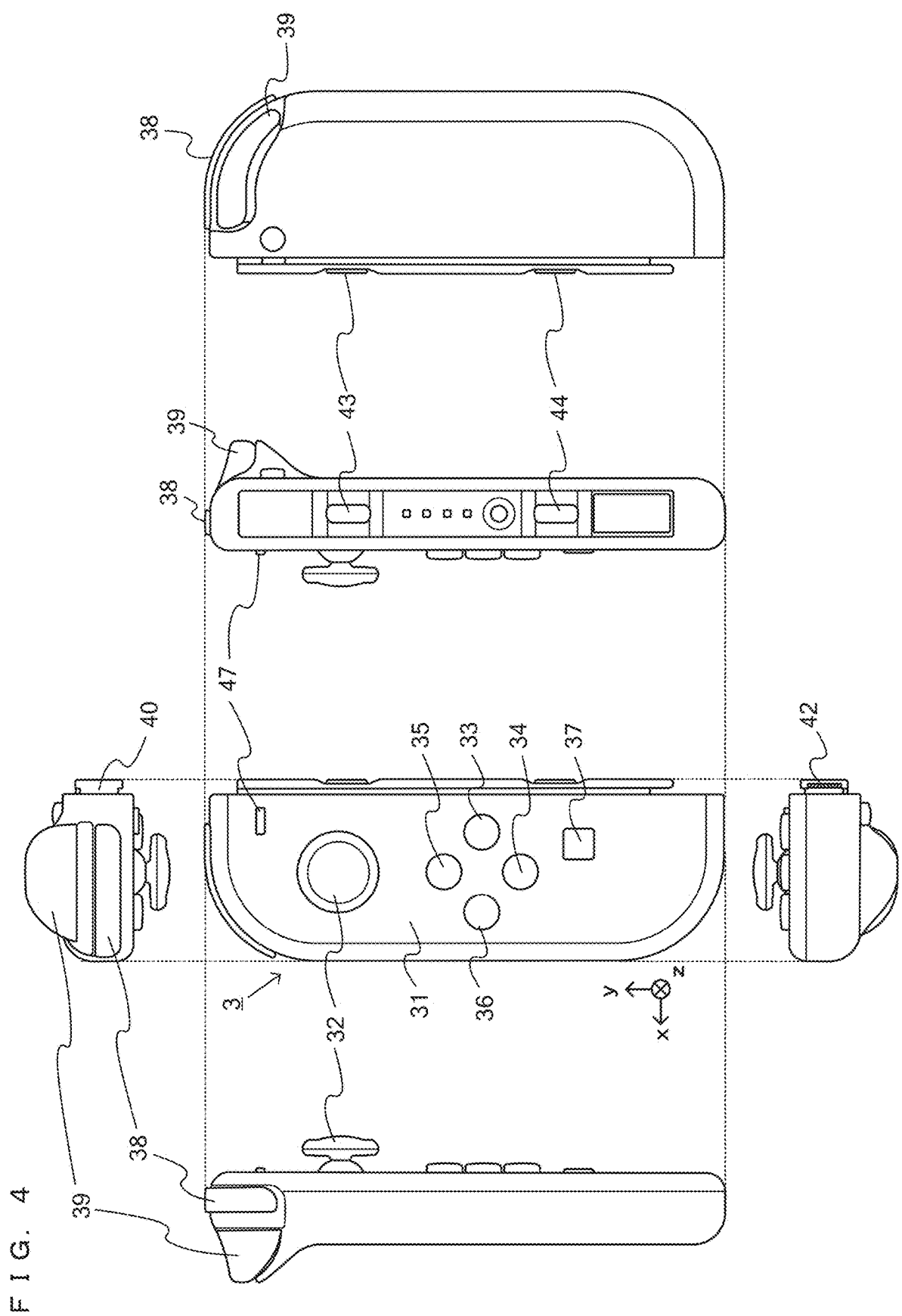
FIG. 4 illustrates six orthogonal views of a non-limiting example of a left controller 3.

FIG. 4 illustrates six orthogonal views of an example of the left controller 3. As illustrated in FIG. 4, the left controller 3 includes a housing 31. In the present example, the housing 31 has a vertically long shape, e.g., is shaped to be long in an up-down direction (i.e., a y-axis direction illustrated in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As illustrated in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the present example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−"

(minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 also includes a terminal 42 that enables wired communication between the left controller 3 and the main body apparatus 2.

Figure 5:
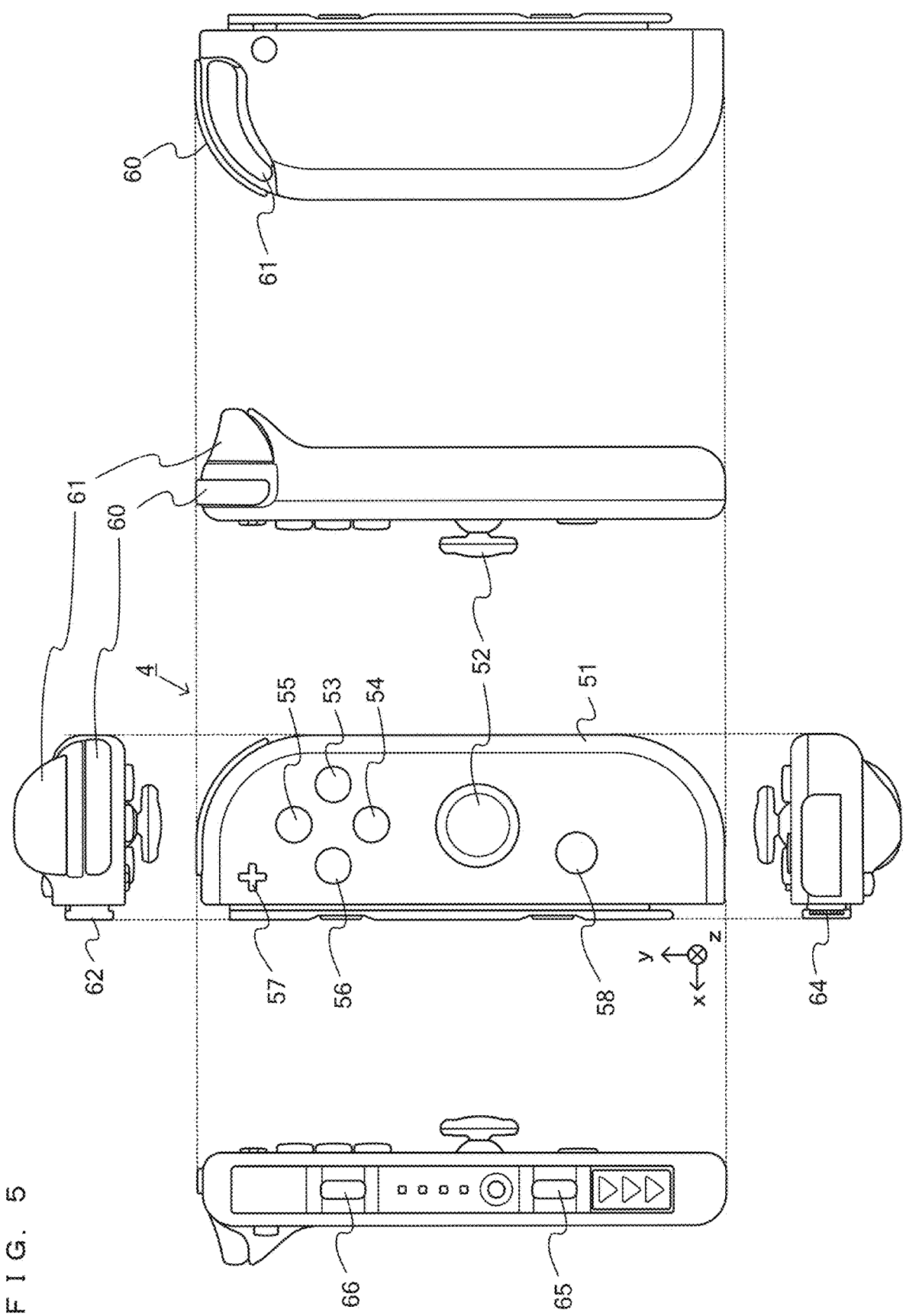
FIG. 5 illustrates six orthogonal views of a non-limiting example of a right controller 4.

FIG. 5 illustrates six orthogonal views of an example of the right controller 4. As illustrated in FIG. 5, the right controller 4 includes a housing 51. In the present example, the housing 51 has a vertically long shape, e.g., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the present example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for allowing the right controller 4 to perform wired communication with the main body apparatus 2.

Figure 6:
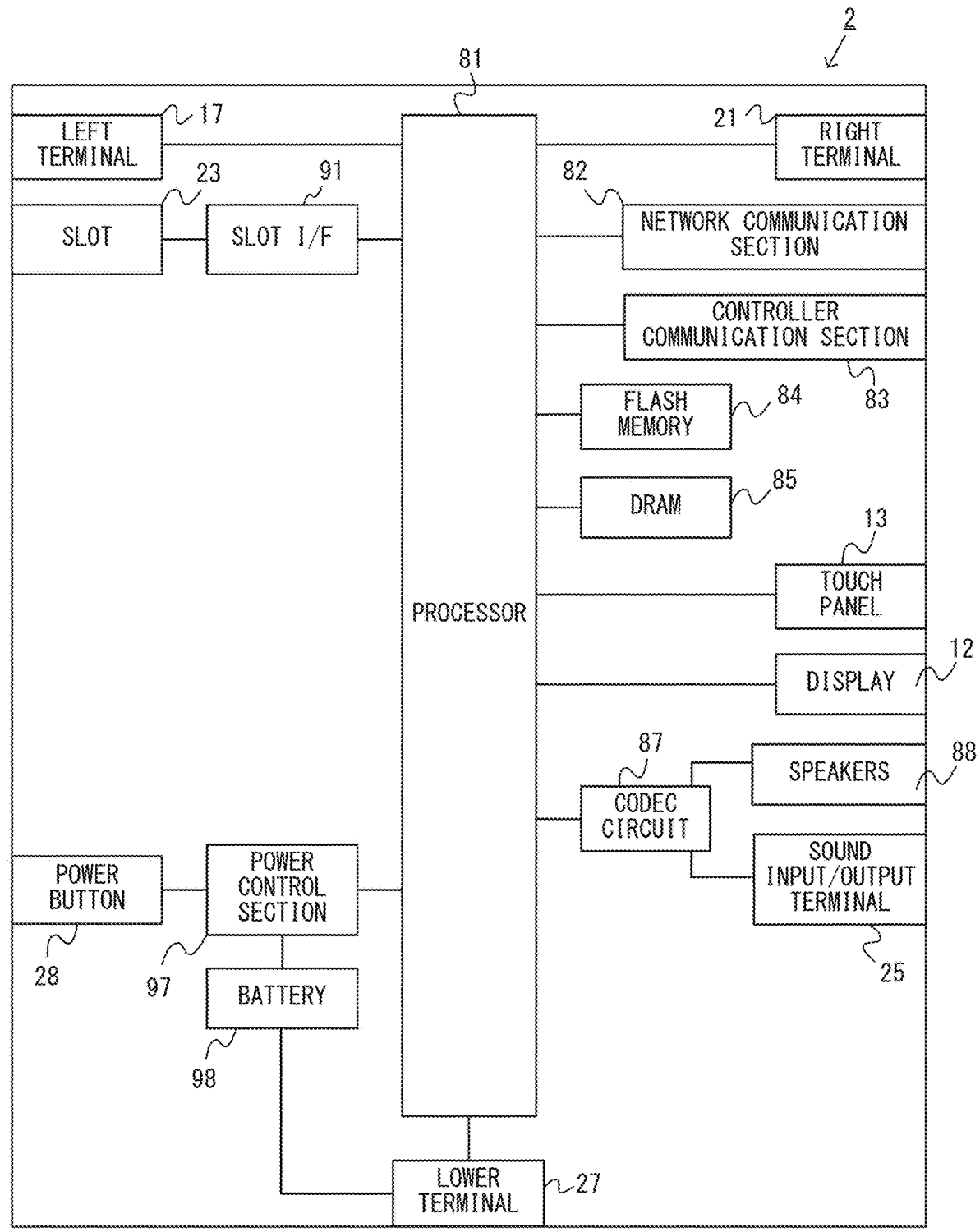
FIG. 6 is a block diagram illustrating a non-limiting example of an internal configuration of a main body apparatus 2.

FIG. 6 is a block diagram illustrating an example of an internal configuration of the main body apparatus 2. The main body apparatus 2 includes components 81 to 91, 97, and 98 illustrated in FIG. 6 in addition to the components illustrated in FIG. 3. Some of the components 81 to 91, 97, and 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In the present example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication", in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In the present example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in the present example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. As an example, a first user can provide an input to the main body apparatus 2 using a first set of left and right controllers 3 and 4, and at the same time, a second user can provide an input to the main body apparatus 2 using a second set of left and right controllers 3 and 4.

Further, the display 12 is connected to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is connected to the speakers 88 and an audio input/output terminal 25 and also connected to the processor 81. The codec circuit 87 is for controlling the input and output of audio data to and from the speakers 88 and the sound input/output terminal 25.

The main body apparatus 2 includes a power control section 97 and a battery 98. The power control section 97 is connected to the battery 98 and the processor 81. Further, although not illustrated, the power control section 97 is connected to components of the main body apparatus 2 (specifically, components that receive power supplied from the battery 98, the left-side terminal 17, and the right-side terminal 21). Based on a command from the processor 81, the power control section 97 controls the supply of power from the battery 98 to each of the above components.

Further, the battery 98 is connected to the lower-side terminal 27. When an external charging device (e.g., the cradle) is connected to the lower-side terminal 27, and power is supplied to the main body apparatus 2 via the lower-side terminal 27, the battery 98 is charged with the supplied power.

Figure 7:
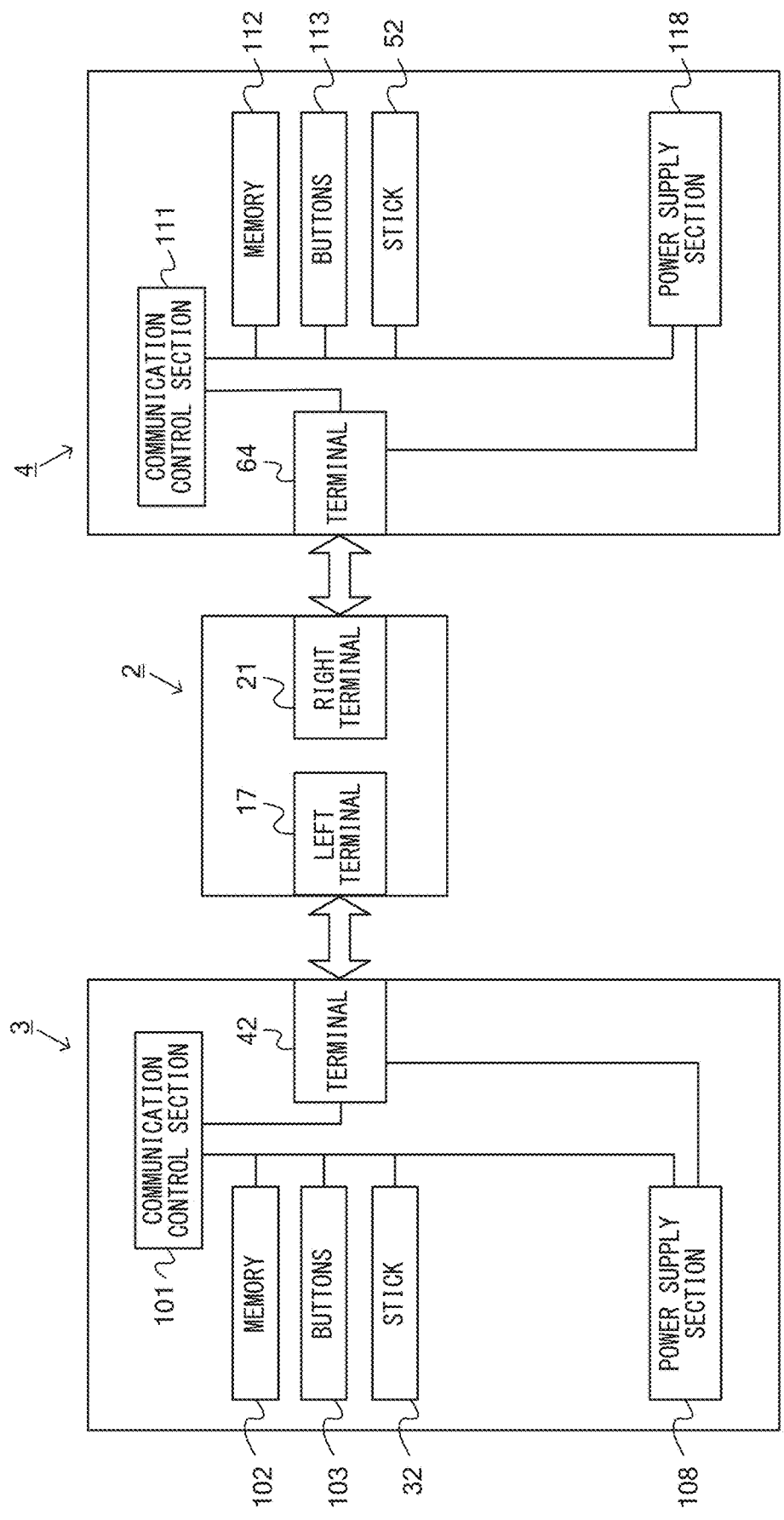
FIG. 7 is a block diagram illustrating non-limiting examples of internal configurations of a main body apparatus 2, a left controller 3, and a right controller 4.

FIG. 7 is a block diagram illustrating examples of the internal configurations of the main body apparatus 2, the left controller 3, and the right controller 4. It should be noted that the details of the internal configuration of the main body apparatus 2 are illustrated in FIG. 6 and therefore are omitted in FIG. 7.

The left controller 3 includes a communication control section 101, which communicates with the main body apparatus 2. As illustrated in FIG. 7, the communication control section 101 is connected to components including the terminal 42. In the present example, the communication control section 101 can communicate with the main body apparatus 2 through both wired communication via the terminal 42 and wireless communication without via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the present example, the power supply section 108 includes a battery and a power control circuit. Although not illustrated in FIG. 7, the power control circuit is connected to the battery and also connected to components of the left controller 3 (specifically, components that receive power supplied from the battery).

As illustrated in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication without via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As described above, in the game system 1 of the present example, the left controller 3 and the right controller 4 are removable from the main body apparatus 2. In addition, when the unified apparatus obtained by attaching the left controller 3 and the right controller 4 to the main body apparatus 2 or the main body apparatus 2 alone is attached to the cradle, an image (and sound) can be output on an external display device, such as a stationary monitor or the like. The game system 1 will be described below according to an embodiment in which an image is displayed on the display 12. It should be noted that in the case in which the game system 1 is used in an embodiment in which an image is displayed on the display 12, the game system 1 may be used with the left controller 3 and the right controller 4 attached to the main body apparatus 2 (e.g., the main body apparatus 2, the left controller 3, and the right controller 4 are integrated in a single housing).

A game is played using a virtual space displayed on the display 12, according to operations performed on the operation buttons and sticks of the left controller 3 and/or the right controller 4, or touch operations performed on the touch panel 13 of the main body apparatus 2, in the game system 1. In the present example, as an example, a game can be played in which a player character PC is moved in a virtual space according to the user's operation performed using the operation buttons, the sticks, and the touch panel 13.

Figure 8:
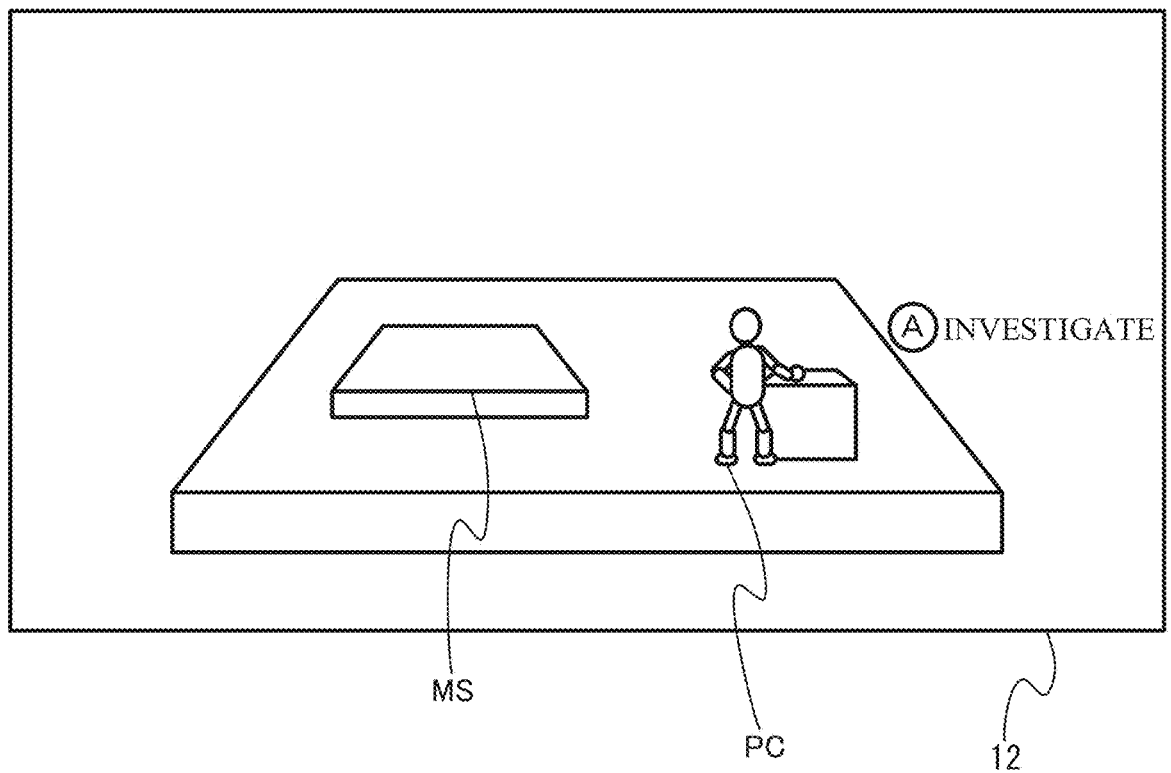
FIG. 8 is a diagram illustrating a non-limiting example of an image of a first stage that is displayed during a process of unlocking a map of a virtual space.
Figure 9:
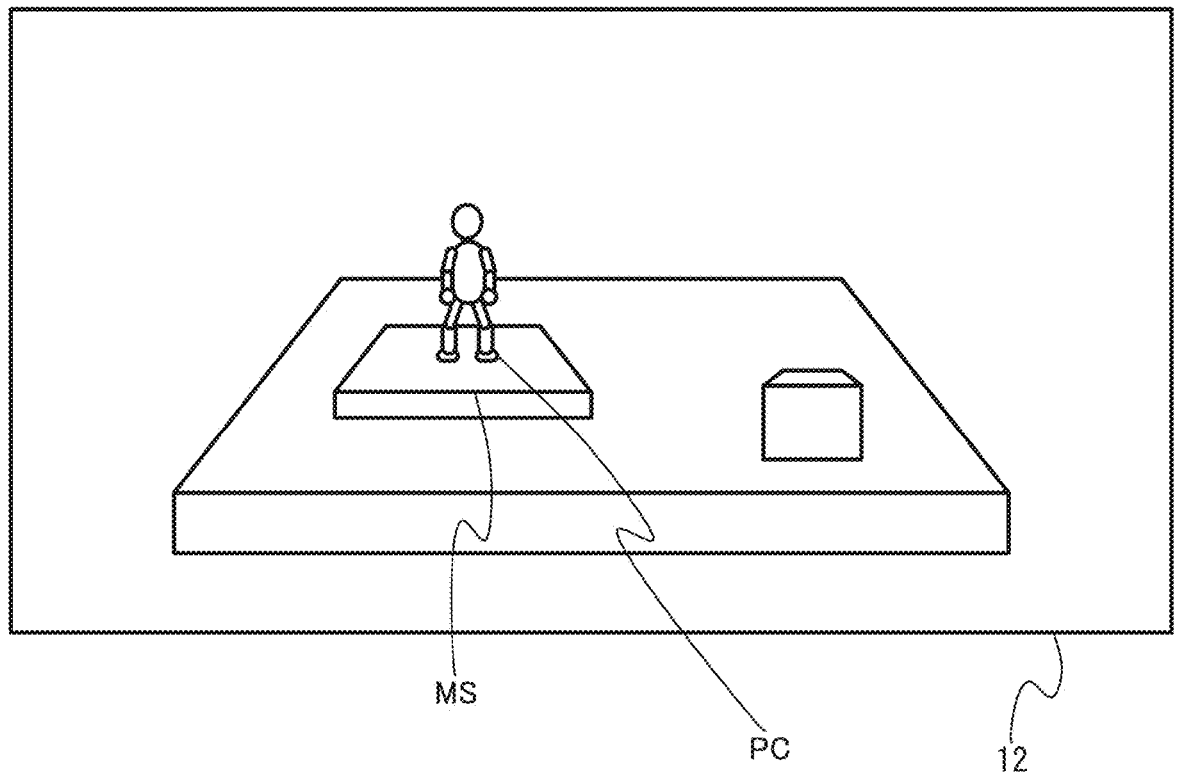
FIG. 9 is a diagram illustrating a non-limiting example of an image of a second stage that is displayed during a process of unlocking a map of a virtual space.
Figure 10:
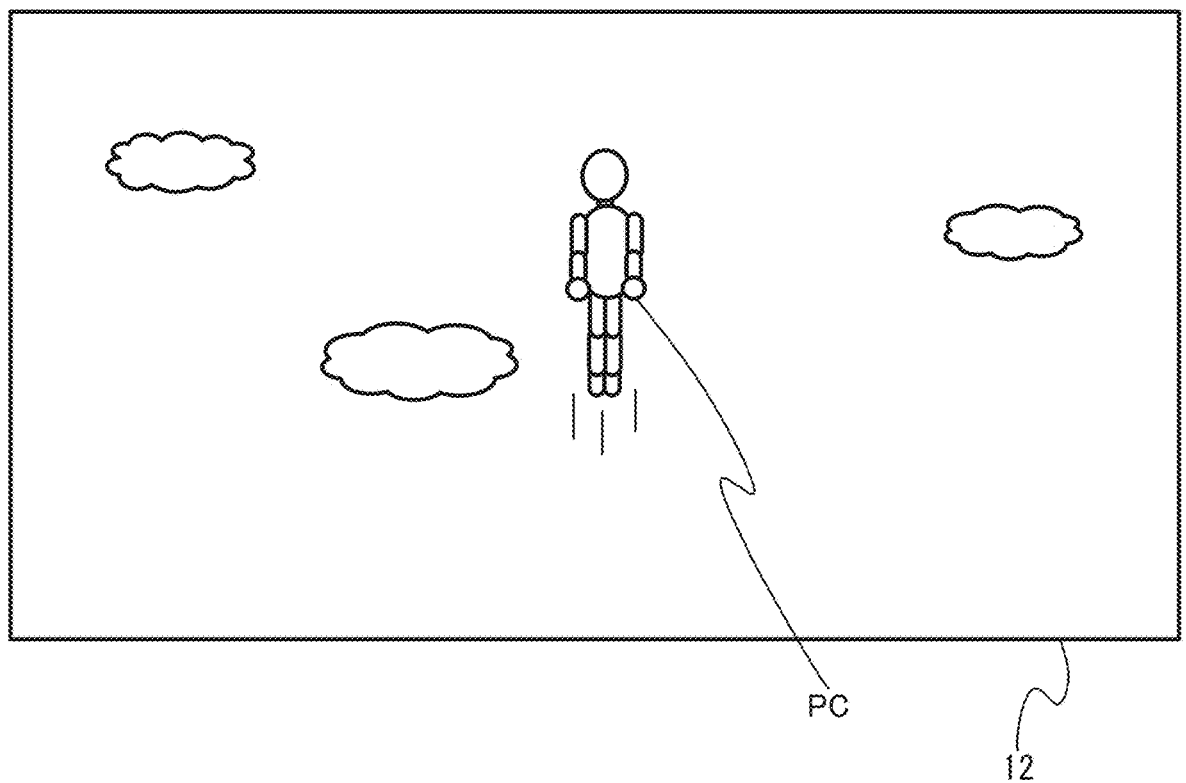
FIG. 10 is a diagram illustrating a non-limiting example of an image of a third stage that is displayed during a process of unlocking a map of a virtual space.
Figure 11:
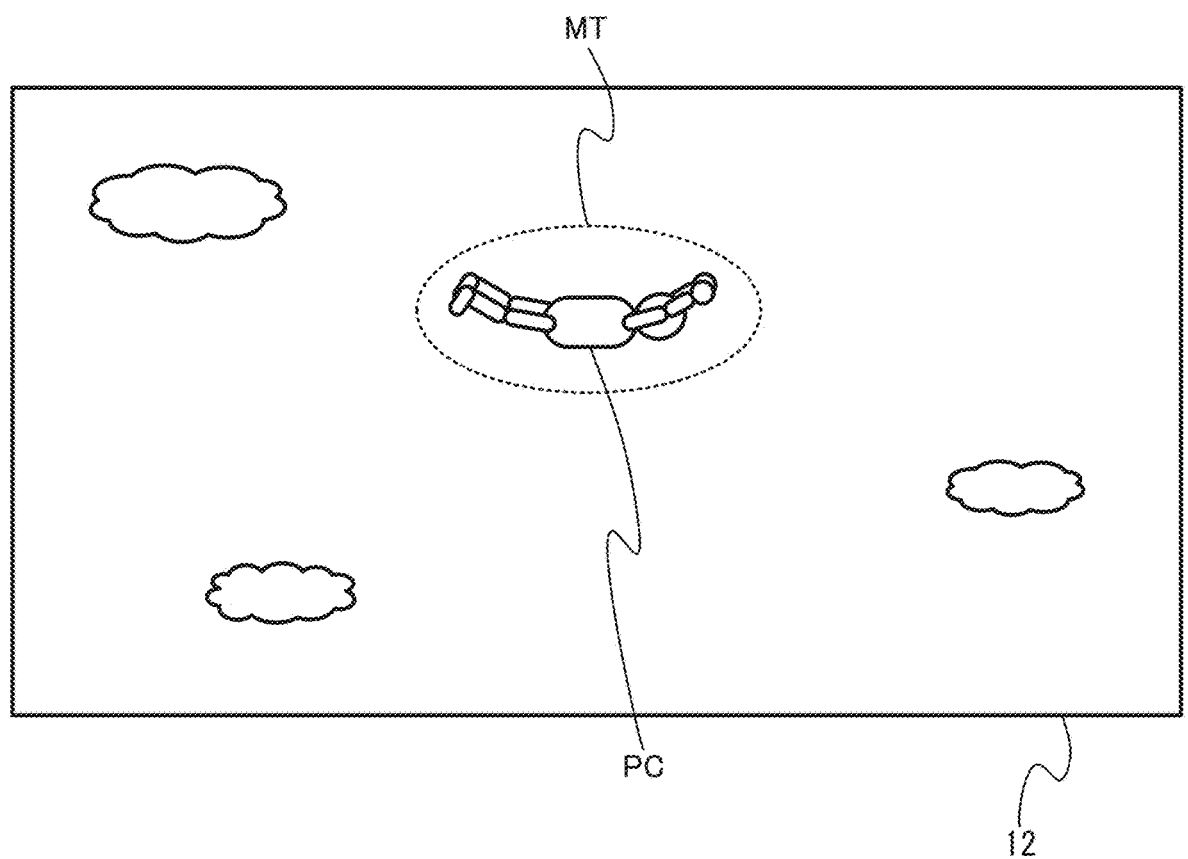
FIG. 11 is a diagram illustrating a non-limiting example of an image of a fourth stage that is displayed during a process of unlocking a map of a virtual space.
Figure 12:
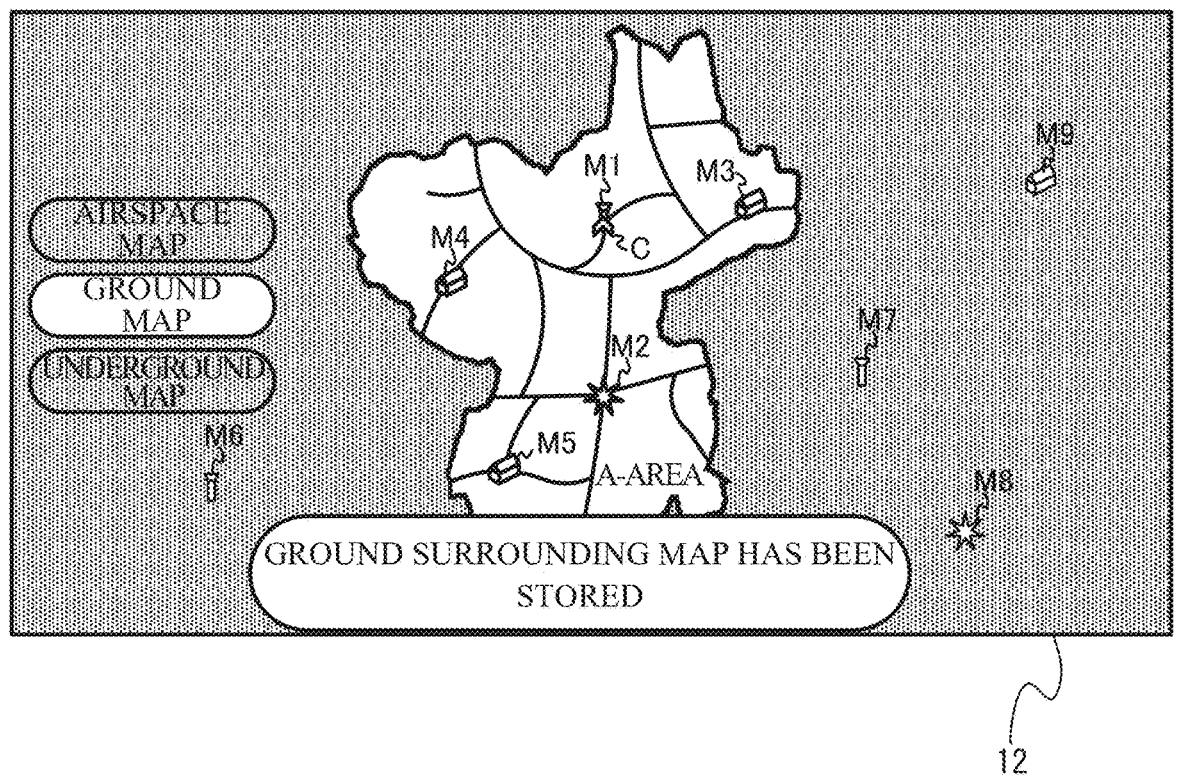
FIG. 12 is a diagram illustrating a non-limiting example of an image of a fifth stage that is displayed during a process of unlocking a map of a virtual space.
Figure 13:
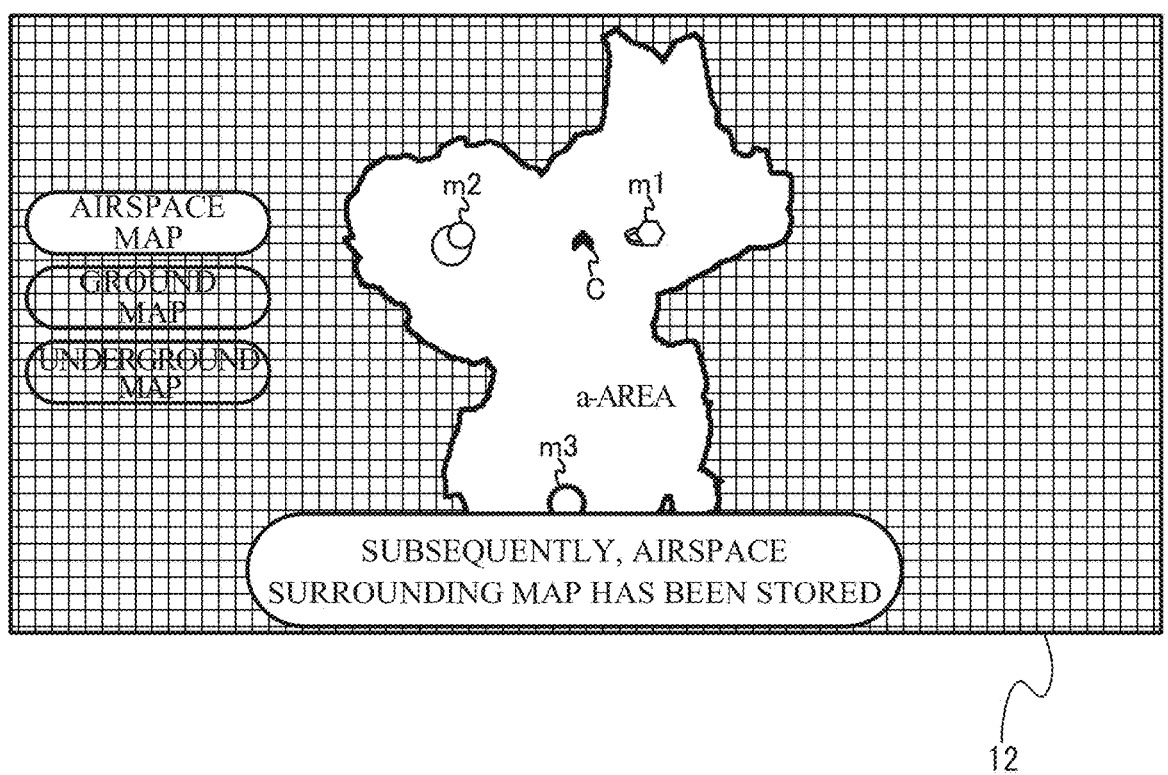
FIG. 13 is a diagram illustrating a non-limiting example of an image of a sixth stage that is displayed during a process of unlocking a map of a virtual space.
Figure 16:
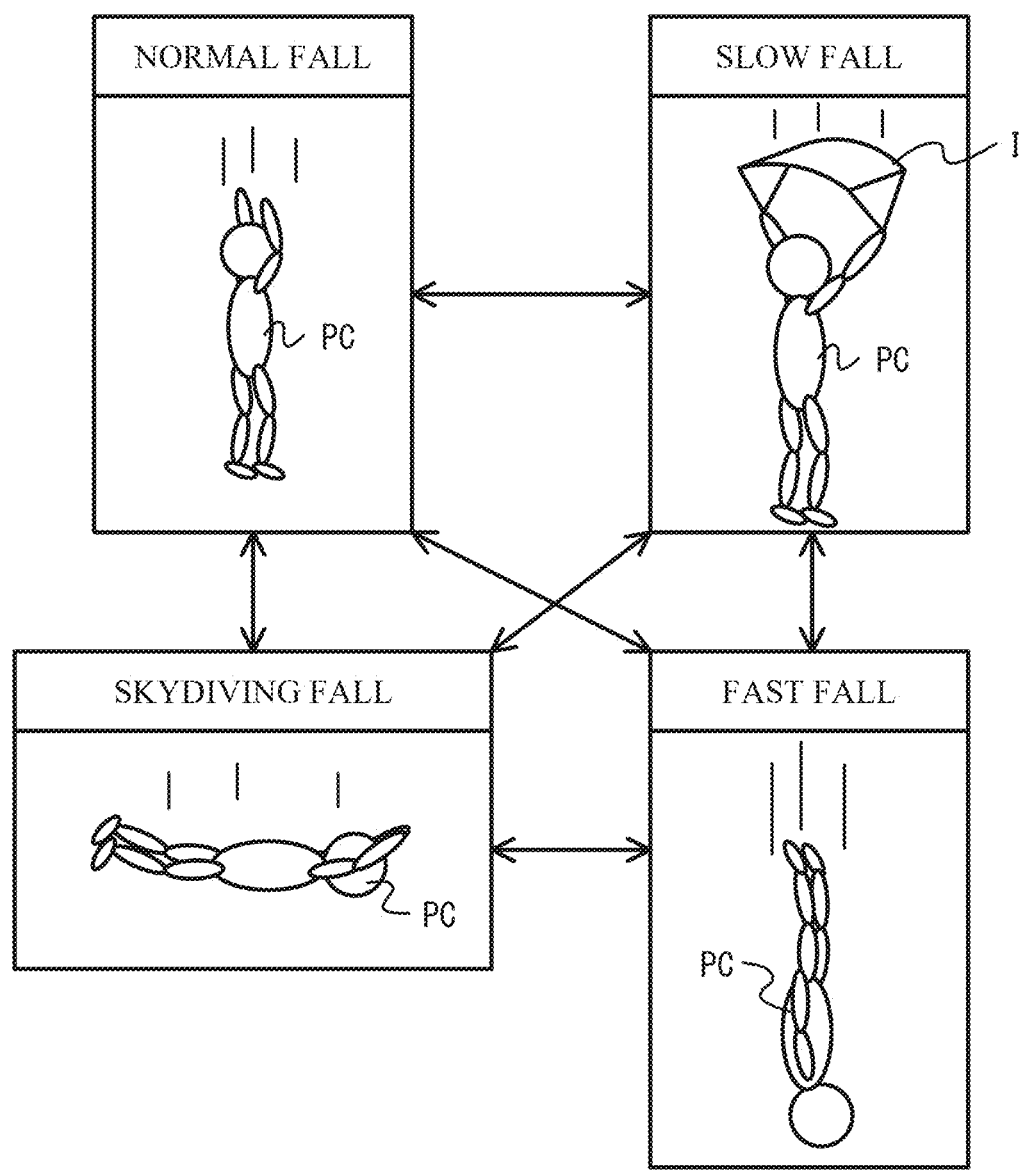
FIG. 16 is a diagram illustrating a non-limiting example of a position which a player character PC adopts when falling and moving in a virtual space.
Figure 17:
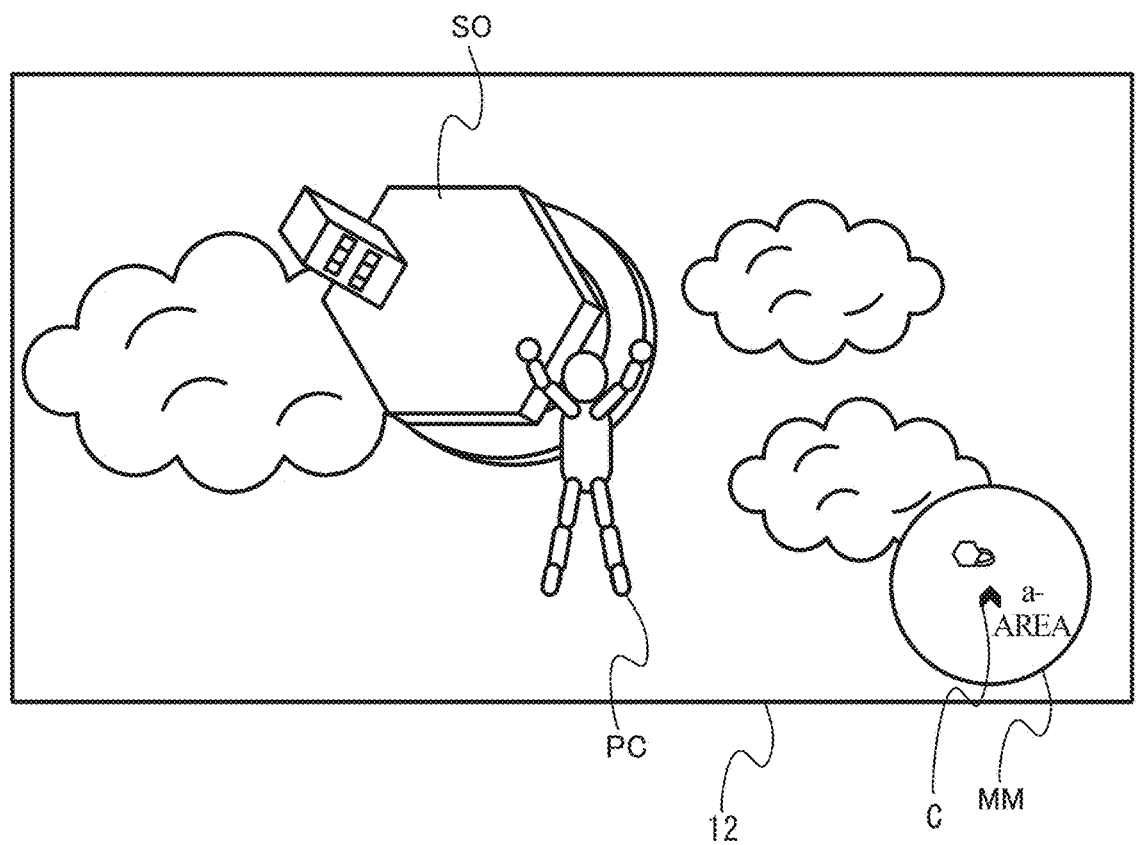
FIG. 17 is a diagram illustrating a non-limiting example of an image that is displayed when a player character PC is falling and moving in an airspace field in a virtual space.
Figure 18:
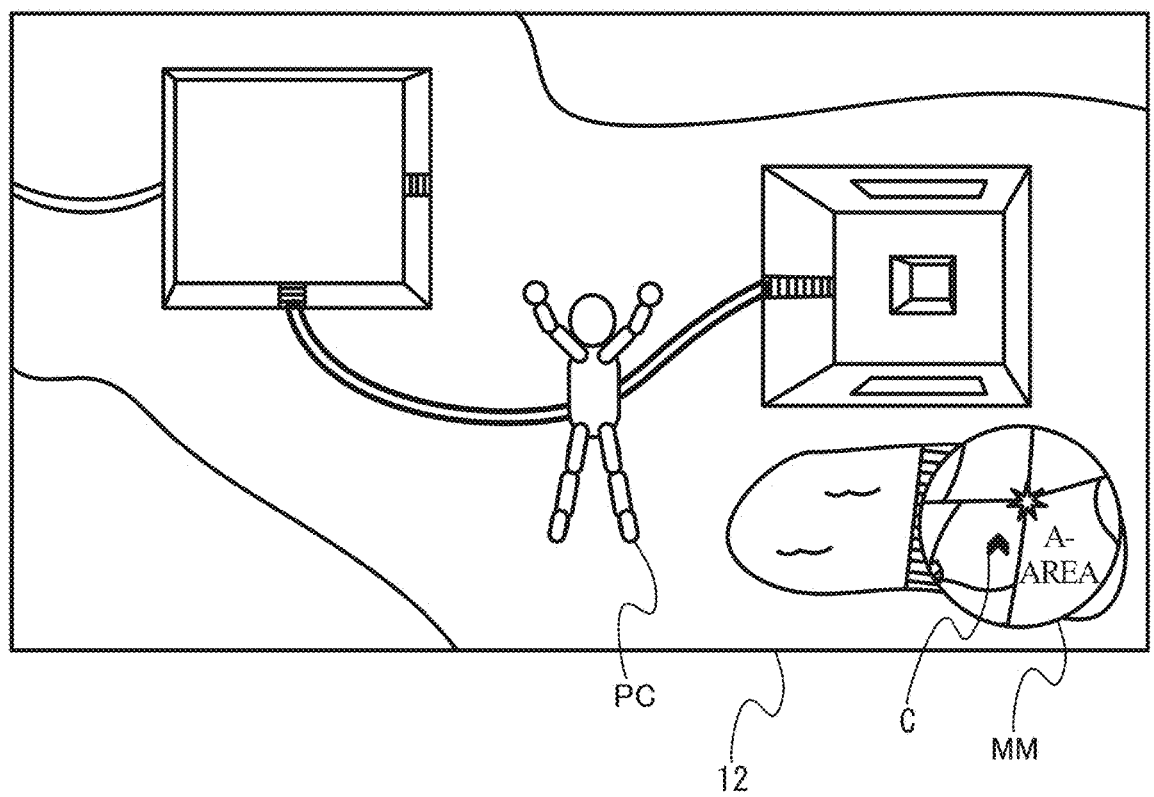
FIG. 18 is a diagram illustrating a non-limiting example of an image that is displayed when a player character PC is falling and moving on a ground field in a virtual space.

A game process that is executed in the game system 1 will be outlined with reference to FIGS. 8 to 18. It should be noted that FIG. 8 is a diagram illustrating an example of an image of a first stage that is displayed during a process of unlocking a map of a virtual space. FIG. 9 is a diagram illustrating an example of an image of a second stage that is displayed during a process of unlocking a map of a virtual space. FIG. 10 is a diagram illustrating an example of an image of a third stage that is displayed during a process of unlocking a map of a virtual space. FIG. 11 is a diagram illustrating an example of an image of a fourth stage that is displayed during a process of unlocking a map of a virtual space. FIG. 12 is a diagram illustrating an example of an image of a fifth stage that is displayed during a process of unlocking a map of a virtual space. FIG. 13 is a diagram illustrating an example of an image of a sixth stage that is displayed during a process of unlocking a map of a virtual space. FIG. 14 is a diagram illustrating an example of locked and unlocked ground maps that are displayed when map information of an A-area region, of locked ground maps. FIG. 15 is a diagram illustrating an example of locked and unlocked airspace maps that are displayed when map information of an a-area region is unlocked, of locked airspace maps. FIG. 16 is a diagram illustrating an example of a position which a player character PC adopts when falling and moving in a virtual space. FIG. 17 is a diagram illustrating an example of an image that is displayed when a player character PC is falling and moving in an airspace field in a virtual space. FIG. 18 is a diagram illustrating an example of an image that is displayed when a player character PC is falling and moving on a ground field in a virtual space.

FIG. 8 illustrates an image in which a player character PC is located in a specific building in a virtual space. The player character PC is allowed to move at least on a ground field in the virtual space and in an airspace field above the ground field, based on the user's movement operation input. It should be noted that in the present example, a ground field is defined as a surface and an extent of space located lower than a predetermined height above the surface in a virtual space, and an airspace field is defined as an extent of space located higher than or equal to the predetermined height, for the sake of convenience. All or a portion of a ground field is represented by a ground map, and all or a portion of an airspace field is represented by an airspace map. A ground field and an airspace field may not actually be separated in a virtual space.

A ground map indicating map information of a ground field is divided into a plurality of ground areas. In addition, the ground map includes, for each ground area, a map in a first state including predetermined map information (e.g., a map of a ground area showing detailed map information) or a map in a second state that does not include the predetermined map information (e.g., a map of a ground area not showing detailed map information). By the player character PC performing an action of unlocking map information in a ground area, a map of that ground area can be changed from the second state to the first state.

The specific building is a place where the player character PC needs to visit in order to unlock map information of a ground area corresponding to a ground field where the specific building is provided. At least one specific building is provided on a ground field corresponding to each ground area. If, when the player character PC is located in the specific building, the user performs an operation input for executing an "investigate" command, a series of scenes showing unlocking of map information of a ground area corresponding to a ground field where the specific building is provided are started. It should be noted that the user's operation input for causing the player character PC to perform an action of unlocking map information corresponds to an example of a first condition.

In the specific building, a movement start stage MS is set. As illustrated in FIG. 9, when the user's operation input for executing the "investigate" command is performed, a scene in which the player character PC moves onto the movement start stage MS is displayed. It should be noted that the specific building and/or the movement start stage MS correspond to an example of a first location in a first ground area.

As illustrated in FIG. 10, after the player character PC has moved onto the movement start stage MS, a scene in which the player character PC rises and moves in the virtual space is displayed. For example, the player character PC moves directly upward from the movement start stage MS, i.e., from a ground field toward an airspace field in the virtual space. Thus, the specific building is a place where the player character PC needs to visit in order to unlock map information, and also serves as a place that allows the player character PC to move upward into an airspace.

As illustrated in FIG. 11, when the player character PC reaches a movement target location MT set in an airspace field in the virtual space due to the upward movement, a scene is displayed in which the player character PC ends the upward movement, and temporarily stays in the air at the movement target location MT. The movement target location MT is set in an airspace field that is located directly above the specific building (movement start stage MS). A height of the movement target location MT may be an invariable height difference from the specific building (movement start stage MS), or a height difference that varies among ground fields corresponding to ground areas. It should be noted that the movement target location MT is set to a height that is higher than at least one airspace field object SO described below. The specific building provided on a ground field corresponding to each ground area may be provided at a different altitude on the ground field. Even when the height of the movement target location MT is set to the same height difference from different specific buildings, different movement target locations MT may have different heights. It should be noted that the movement target location MT corresponds to an example of a second location in an airspace field corresponding to a first airspace area.

After the player character PC stays in the air at the movement target location MT, a scene is displayed which indicates that map information of the current area has been unlocked. In the present example, after the player character PC has moved to the movement target location MT, the above scene is displayed by displaying a ground map in which predetermined map information is shown in a region of a ground area (e.g., an A-area) corresponding to a ground field where the specific building (movement start stage MS) is provided, and an airspace map in which predetermined map information is shown in a region of an airspace area (e.g., an a-area) corresponding to an airspace above the specific building (movement start stage MS).

For example, as illustrated in FIG. 12, in the scene indicating that map information has been unlocked, a ground map that includes an A-area corresponding to a ground field where the specific building (movement start stage MS) is provided, and in which detailed map information is shown in a region of the A-area, is displayed together with information notifying that entry of a surrounding map of the ground has been performed. Here, detailed map information shown in a region of a ground area due to the unlocking of map information includes terrain information such as the names, shapes, contours, and the like of seas, lakes, ponds, rivers, mountains, hills, forests, plains, and the like in the ground area, installation/construction information such as the names, shapes, locations, and the like of roads, bridges, constructions, and the like provided on a ground field corresponding to the ground area, and the like. For example, in an example of a ground map illustrated in FIG. 12, roads and constructions M1 to M5 constructed on a ground field corresponding to the A-area are represented by a mark, and the shape, type, location, and the like of each object are shown. In addition, the displayed ground map indicates the current location C of the player character PC in the current area. It should be noted that in the example of FIG. 12, a situation is shown in which a ground map is unlocked with the player character PC located in an airspace field, and therefore, the current location C is indicated by providing a label (e.g., an open mark) indicating that the player character PC is located in a field different from the ground field, at a location on the ground field directly below the player character PC, which is currently located in the airspace field.

Next, as illustrated in FIG. 13, in the scene indicating that map information has been unlocked, an airspace map that includes an a-area which is an airspace area corresponding to an airspace above the specific building (movement start stage MS), and shows detailed map information in a region of the a-area, is displayed together with information notifying that entry of a surrounding map of the airspace has been performed. Here, detailed map information shown in a region of an airspace area due to the unlocking of map information includes information about the names, shapes, locations, and the like of airspace field objects staying in an airspace field corresponding to the airspace area, and the like. For example, in an example of an airspace map illustrated in FIG. 13, airspace field objects m1 to m3 staying in an airspace field corresponding to the a-area are shown, indicating the shapes, types, locations, and the like thereof. In addition, in the displayed airspace map, the current location C of the player character PC in the current area is shown. It should be noted that in the example of FIG. 13, it is indicated that an airspace map is unlocked with the player character PC located in an airspace field, and therefore, the current location C is represented by a label (e.g., a closed mark) indicating that the player character PC is located in an airspace field corresponding to a location on the airspace map.

It should be noted that in the display example of the map, a closed mark is used as an example of a label for the current location C indicating that the player character PC is actually present on a field on the displayed map, and an open mark is used as an example of a label for the current location C indicating that the player character PC is located on a field different from that on the displayed map. Alternatively, other display forms may be used. The current location C indicating that the player character PC is actually present on a field on the displayed map may be displayed in a relatively noticeable form (e.g., a label having a higher luminance, a label having a larger size, a flickering label, a label whose size is alternately enlarged and reduced, or the like), whereby the user can more easily recognize a field where the player character PC is located.

It should be noted that as an example, a plurality of ground areas obtained by dividing a ground map, and a plurality of airspace areas obtained by dividing an airspace map, may indicate field regions that have the same shape and are disposed on top of each other in the virtual space. In that case, an airspace above a ground field corresponding to one ground area is an airspace field corresponding to all the same airspace area, and these fields are represented as a region having the same shape on the ground map and the airspace map. As another example, a ground area and an airspace area may have different shapes. In any case, when map information is unlocked, a ground area corresponding to a ground field where the specific building (movement start stage MS) is disposed, and an airspace area corresponding to an airspace field (location movement target location MT) directly above the specific building, are to be unlocked.

The timing of unlocking map information may be either after or before the player character PC has reached the movement target location MT. In the latter case, map information of a ground area and an airspace area may be unlocked with the player character PC located on a ground field, before or immediately after the player character PC has moved to the movement start stage MS in the specific building. Alternatively, map information of a ground area and an airspace area may be unlocked during upward movement of the player character PC toward the movement target location MT. In any of these examples, the timing with which a process of unlocking map information of a ground area and an airspace area is executed and the timing with which a scene indicating the unlocking of map information is displayed may be the same or different.

Next, an example of a change in a map image between before and after the unlocking of map information will be described with reference to FIGS. 14 and 15.

The lower portion of FIG. 14 illustrates an example of a ground map including an A-area having unlocked map information and the other area, for which map information thereof is locked. As described above, detailed map information including terrain information, installation/construction information, and the like is shown in the entire region of the A-area on the ground map. Specifically, the ground map shows roads and constructions M1 to M5 constructed on a ground field corresponding to the entire A-area, indicating the shapes, types, locations, and the like thereof. In addition, for the other area on the ground map, map information thereof is locked, and detailed map information thereof is not shown, unlike the A-area. In the present example, for the entirety of a ground area for which map information thereof is locked, map information thereof is not shown at all, or is only partially shown. For example, in the example illustrated in the lower portion of FIG. 14, only installation/construction information of constructions and the like on a ground field that the player character PC has visited before the current time (information about constructions M6 to M9 illustrated in the lower portion of FIG. 14) is shown.

The upper portion of FIG. 14 illustrates an example of a ground map in which map information of the A-area illustrated in the lower portion of FIG. 14 is also locked, i.e., map information of all ground areas displayed is locked. As illustrated in the upper portion of FIG. 14, for the region of the A-area before unlocking of map information, only a portion of the information is shown. Specifically, in the example illustrated in the upper portion of FIG. 14, before map information of the A-area is unlocked, only installation/construction information of constructions and the like on a ground field corresponding to the A-area that the player character PC has visited before the current time (information about constructions M1 and M4 illustrated in the upper portion of FIG. 14) is shown.

As can be seen from comparison of the upper and lower portions of FIG. 14, on the ground map of the A-area before unlocking of map information, much less map information is shown than after unlocking, i.e., map information is shown for only a portion of the A-area. It should be noted that a displayed ground map shows the current location C of the player character PC no matter whether or not map information thereof has been unlocked. In the example of FIG. 14, in both of the upper and lower portions of FIG. 14, a ground map is displayed with the player character PC located on a ground field, and therefore, the current location C is represented by a label (e.g., a closed mark) indicating that the player character PC is located on a ground field corresponding to a location on the ground map.

The lower portion of FIG. 15 illustrates an example of an airspace map including an a-area having unlocked map information and the other area, for which map information thereof is locked. As described above, for the entire region of the a-area in the airspace map, detailed map information including information about the names shapes, locations, and the like of airspace field objects and the like is shown. Specifically, the airspace map shows airspace field objects m1 to m3 staying in an airspace field corresponding to the entire a-area, indicating the shapes, types, locations, and the like thereof. For the region of the other area in the airspace map, map information thereof is locked, and detailed map information thereof is not shown, unlike the a-area. In the present example, for the entirety of an airspace area for which map information thereof is locked, map information thereof is not shown at all, or is only partially shown. For example, in the example illustrated in the lower portion of FIG. 15, no map information is shown for the area other than the a-area.

The upper portion of FIG. 15 illustrates an example of an airspace map in which map information of the a-area illustrated in the lower portion of FIG. 15 is also locked, i.e., map information of all airspace areas displayed is locked. As illustrated in the upper portion of FIG. for the region of the a-area before unlocking of map information, no map information is shown.

As can be seen from comparison of the upper and lower portions of FIG. 15, in the airspace map of the a-area before unlocking of map information, much less map information is shown than after unlocking. It should be noted that a displayed airspace map shows the current location C of the player character PC no matter whether or not map information thereof has been unlocked. In the example of FIG. 15, in both of the upper and lower portions of FIG. a ground map is displayed with the player character PC located on the ground field, and therefore, the current location C is represented by a label (e.g., an open mark) indicating that the player character PC is located on a field different from an airspace field, at a location on an airspace map corresponding to an airspace field directly above the player character PC, which is currently located on the ground field.

After a scene is displayed which indicates that map information of the current area has been unlocked, at the movement target location MT, the action control of the player character PC based on the user's movement operation input is resumed. Specifically, in the present example, when map information of the current area is unlocked, a rising scene in which the player character PC is caused to move upward to the movement target location MT, and a map unlocking scene indicating that the map information has been unlocked, are displayed, and thereafter, the action control of the player character PC based on the user's movement operation input is resumed. As a result, after the user browses map information unlocked in a ground map and an airspace map, the movement control of the player character PC can be resumed from an airspace field, and therefore, an airspace field and a ground field can be more easily explored.

After the action control is resumed, the player character PC falls and moves in the air from the movement target location MT in the airspace field, which is a high place in the virtual space, toward the ground field. In the present example, the user is allowed to perform some operations on the player character PC, which is currently falling. The action control that is performed when the player character PC is falling and moving in the air in the virtual space will be described.

In FIG. 16, in the present example, the player character PC may take a plurality of fall states during falling. For example, the player character PC is controlled such that the player character PC adopts different positions in four fall states (normal fall, slow fall, skydiving fall, and fast fall). It should be noted that in the present example, the player character PC is allowed to transition from one fall state to another fall state according to the user's instruction to change fall states.

As illustrated in FIG. 8, a skydiving fall state is defined as a state in which the player character PC falls with its arms and legs spread, and a front direction of the player character PC (i.e., the front direction with reference to the orientation of the player character PC) pointing downward in the virtual space, like, for example, skydiving. During skydiving fall, the player character PC falls downward in the virtual space according to physical laws (e.g., Newton's first law and Newton's law of universal gravitation) used in a game, at a falling speed that is lower than in a normal fall state and higher than in a slow fall state. It should be noted that in the present example, the player character PC is first put into the skydiving fall state at the time when the player character PC starts falling movement from the movement target location MT.

It should be noted that as used herein, the meaning of "a certain direction points downward" includes the state in which the direction points exactly directly downward in the virtual space, and in addition, the state in which the direction points almost downward in the virtual space. For example, in the case in which a certain direction has an angle of 20° with respect to the directly downward direction in the virtual space, the certain direction can be said to point downward. As used herein, the meaning of "a certain direction points upward" includes the state in which the direction exactly directly upward in the virtual space, and in addition, the state in which the direction points almost upward.

In the present example, in the skydiving fall state, the player character PC falls while moving forward, backward, leftward, or rightward (components parallel to a horizontal plane in the virtual space) with reference to the player character PC, which faces downward in the virtual space (it can be said that the forward direction is almost the falling direction), according to the player's instruction to move upward, downward, leftward, or rightward (e.g., a movement operation input instruction provided by tilting the analog stick 32 of the left controller 3). Specifically, in the skydiving fall state, the player character PC falls downward according to the physical laws of the virtual space while moving in the horizontal direction in the virtual space according to the user's movement operation input.

A normal fall state is defined as a state in which the player character PC falls and moves in the virtual space in a standing position with its arms slightly raised and its head up in the virtual space. In the normal fall state, the user is not allowed to perform an operation of moving the player character PC. In other words, in the normal fall state, the player character PC falls downward according to physical laws used in a game.

A slow fall state is defined as a state in which the player character PC falls and moves in the virtual space using a fall item I which is like a parachute. In the slow fall state, the player character PC falls in the virtual space with its head up in the virtual space as in the normal fall state. In the slow fall state, the player character PC falls in the virtual space at a falling speed lower than in the normal fall state (more specifically, the slowest of the falling speeds in the four fall states). In the slow fall state, the player character PC glides, i.e., falls while moving in a forward direction of the player character PC, in the virtual space.

In addition, in the present example, in the slow fall state, the player character PC falls in the virtual space while moving horizontally according to the user's instruction to move horizontally (e.g., a movement operation input instruction provided by tilting the analog stick 32 of the left controller 3). Specifically, in the slow fall state, the player character PC falls and moves while changing its orientation horizontally according to the user's horizontal movement operation input (e.g., turning horizontally). It should be noted that in the present example, the amount per unit time in which the player character PC can move horizontally in the skydiving fall state is smaller than the amount per unit time in which the player character PC can move horizontally in the slow fall state. In other words, the user is allowed to move the player character PC horizontally to a greater extent in the slow fall state than in the skydiving fall state.

A fast fall state is defined as a state in which the player character PC falls and moves in the virtual space in a standing position with its arms lowered, and with its head facing in the direction of movement, and its head down in the virtual space. In the fast fall state, the player character PC falls and moves at a falling speed higher than in the normal fall state (more specifically, the fastest of the falling speeds in the four fall states).

In the fast fall state, the player character PC also falls while moving forward, backward, leftward, or rightward (components parallel to a horizontal plane in the virtual space) with reference to the player character PC according to the user's instruction to move upward, downward, leftward, or rightward, as in the skydiving fall state. It should be noted that in the present example, the amount per unit time in which the player character PC can move horizontally in the fast fall state is smaller than the amount per unit time in which the player character PC can move horizontally in the skydiving fall state. In other words, the user is allowed to move the player character PC horizontally to a greater extent in the skydiving fall state than in the fast fall state.

Thus, in the present example, while the player character PC is falling and moving, the fall state can be controlled, and the movement control in the horizontal direction of the virtual space is also allowed, according to the user's operation. Therefore, the user is allowed to more easily explore an airspace field and a ground field while browsing an airspace map and a ground map showing unlocked map information. In addition, the movement control of the player character PC is resumed from the movement target location MT in an airspace field located directly above a specific building on a ground field. Therefore, the location of the player character PC in an airspace field can be recognized with reference to the specific building, and the movement control of the player character PC can be resumed with reference to the specific building, whereby an airspace field and a ground field can be even more easily explored.

FIG. 17 illustrates an example of a game image that is displayed when the player character PC is in the skydiving fall state in an airspace field. In the present example, the action control of the player character PC based on the user's movement operation input is resumed from the movement target location MT, and when the player character PC starts falling movement in the skydiving fall state, a virtual camera is set such that the virtual camera is located above the player character PC (more specifically, a higher location in a game space), and faces downward in the virtual space and follows the falling movement of the player character PC. Such setting of a virtual camera is automatically performed by the game system 1 (i.e., without the user's movement operation input for the virtual camera). Therefore, as illustrated in FIG. 17, when the action control of the player character PC is resumed, a game image indicating the virtual space as viewed from a viewpoint behind the player character PC in the falling movement direction of the player character PC is displayed on the display 12. As a result, the user is allowed to intuitively recognize that the player character PC has been put into a state in which the player character PC is falling in the virtual space in the skydiving fall state. In addition, the virtual camera is oriented in the movement direction of the player character PC during the falling movement, and therefore, the user can more easily perform the movement operation of the player character PC in the skydiving fall state, and thereby can more easily recognize a destination corresponding to map information indicated by a ground map or an airspace map.

It should be noted that the game image of FIG. 17 includes an airspace field object SO that stays in an airspace field. The player character is allowed to land on the airspace field object SO. The airspace field object SO may be a terrain of an island staying in the air. A building such as a tower or castle may be provided on that terrain. In the game image of FIG. 17, the airspace field object SO is disposed below the player character PC, which is currently falling and moving. That is, the falling movement of the player character PC has started from a location that is at least higher than a location where the airspace field object SO is disposed. Here, when control is performed by the user providing a movement instruction such that the player character PC falls and reaches the airspace field object SO, the player character PC can stop the falling movement and land on the airspace field object SO. Thus, once the player character PC has moved to the movement target location MT, the player character PC can move toward the desired airspace field object SO after the action control is resumed. In order to allow the player character PC to land on such an airspace field object SO, the movement target location MT is set to a location higher than at least one airspace field object SO. That is, there may be an airspace field object SO that is disposed higher than the movement target location MT.

In addition, the game image of FIG. 17 includes a mini-map image MM. Here, when the player character PC is located in an airspace field, the mini-map image MM displays a portion of an airspace map image including an airspace area corresponding to the airspace field where the player character PC is located. For example, the game image of FIG. 17 displays, as the mini-map image MM, a portion of the airspace map of an a-area corresponding to an airspace field where the player character PC is located. It should be noted that map information of an airspace map displayed in the mini-map image MM is displayed, depending on the locked/unlocked state of a displayed area. In the example of FIG. 17, the a-area is already unlocked, and therefore, the above detailed map information is also shown in the airspace map of the a-area shown in the mini-map image MM. In addition, the mini-map image MM shows the current location C of the player character PC. For example, in the example of FIG. 17, the current location C is represented by a label (e.g., a closed mark) indicating that the player character PC is located in the airspace field indicated by the mini-map image MM.

FIG. 18 illustrates an example of a game image that is displayed when the player character PC is in the skydiving fall state on a ground field. When the falling movement of the player character PC based on the user's movement operation input is continued, the player character PC moves from an airspace field to a ground field. In the present example, even when the player character PC has entered a ground field, a virtual camera is set such that the virtual camera is located above the player character PC, facing downward in the virtual space, thereby following the player character PC. Such setting of a virtual camera is automatically performed by the game system 1. Therefore, as illustrated in FIG. 18, even when the player character PC performs falling movement on a ground field, a game image indicating the virtual space as viewed from a viewpoint behind the player character PC in the falling movement direction of the player character PC is displayed on the display 12. As a result, the virtual camera is aimed in the movement direction of the player character PC during the falling movement. Therefore, the user can more easily perform a movement operation on the player character PC in the skydiving fall state, and can more easily recognize a situation of a ground field where the player character PC moves downward.

It should be noted that the game image of FIG. 18 includes terrains, constructions, and the like disposed on a ground field. In the game image of FIG. 18, terrains, constructions, and the like are disposed on a ground field below the player character PC, which is currently falling and moving. When control is performed by the user providing a movement instruction such that the player character PC moves down to a desired location on a ground field, the player character PC can stop the falling movement at the location and land on the ground.

The game image of FIG. 18 also includes a mini-map image MM. Here, when the player character PC is located on a ground field, the mini-map image MM displays a portion of a ground map image including a ground area corresponding to the ground field where the player character PC is located. For example, in the game image of FIG. 18, a portion of the ground map of an A-area corresponding to the ground field where the player character PC is located is displayed as the mini-map image MM. Specifically, when the player character PC, whose movement can be controlled by the user, is located in an airspace field of at least a predetermined height in the virtual space, the mini-map image MM displays a portion of the image of an airspace map. When the player character PC is located on a ground field of less than the predetermined height, the mini-map image MM displays a portion of the image of a ground map. It should be noted that map information of a ground map displayed in the mini-map image MM is also displayed, depending on the locked/unlocked state of the displayed area. In the example of FIG. 18, the A-area is already unlocked, and therefore, the detailed map information is also shown on the ground map of the A-area indicated by the mini-map image MM. The mini-map image MM displayed for a ground field also displays the current location C of the player character PC. For example, in the example of FIG. 18, the current location C is represented by a label (e.g., a closed mark) indicating that the player character PC is located on the ground field indicated by the mini-map image MM.

Thus, the user is allowed to control the falling direction and/or falling speed of the player character PC during the falling movement after the movement control is resumed, by providing a movement instruction or performing an operation of changing fall states on the player character PC. In another example, the user may be allowed to control only one of the falling direction and falling speed of the player character PC. It should be noted that during the falling movement of the player character PC, the location and orientation of a virtual camera for generating a game image may be changed, depending on the fall state of the player character PC or according to the user's operation. The orientation and fall state of the player character PC may be controlled, depending on the orientation of the virtual camera.

Concerning the four fall states, the position of the player character PC, the motion (e.g. the falling speed) of the player character PC, the permission or prohibition of a movement operation for the player character PC and details of the movement operation, and the permission or prohibition of an operation of a virtual camera and details of the operation, are not particularly limited, i.e., not limited to the above examples. The states that can be taken by the player character PC during falling is not limited to the above four states. In addition, it is not necessary to allow the player character PC to take every one of the four states during falling. In addition, the condition under which the fall states of the player character PC can be changed is not particularly limited.

In the present example, when an operation input (e.g., the user's operation input for choosing the "investigate" command) similar to the operation input for causing the player character PC to perform an action of unlocking map information in the specific building disposed on a ground field corresponding to a ground area for which map information thereof is already unlocked is performed again, the player character PC can be moved upward to a movement target location MT. Specifically, when an operation input for causing the player character PC to perform an action of unlocking map information in the specific building is performed again, a scene is displayed in which the player character PC is moved to a movement start stage MS as in unlocking of map information, and thereafter, is moved upward to the movement target location MT, which is directly above the movement start stage MS. Here, the movement start stage MS and the movement target location MT that are set when the player character PC performs an upward movement may be the same as those that are set in the upward movement scene when map information is unlocked. The player character PC can perform again the same upward movement action that is performed during unlocking of map information, and the specific building can be used as a base for exploration of a ground field and an airspace field.

When the player character PC performs an action of unlocking map information in the specific building again, the action control of the player character PC based on the user's movement operation input is resumed after the player character PC reaches the movement target location MT, without a map unlocking scene indicating that map information of the current area has been unlocked, because the map information of the current area is already unlocked. In other words, in the present example, when map information of the current area is already unlocked, the upward movement scene in which the player character PC moves upward to the movement target location MT is provided, and thereafter, the action control of the player character PC based on the user's movement operation input for causing the player character PC to fall in the air from the movement target location MT toward a ground field is resumed without the map unlocking scene. Thus, in the present example, even when map information is already unlocked, the player character PC is moved upward to an airspace field again, and the action control of the player character PC is resumed, whereby an airspace field and a ground field can be more easily explored again.

It should be noted that the user's operation input for displaying the upward movement scene again and the user's operation input for displaying the first upward movement scene accompanied by unlocking of map information may be the same or different. In addition, the movement target location MT in the upward movement scene displayed again and the movement target location MT in the first upward movement scene accompanied by unlocking of map information may be the same, or different in height in the virtual space and/or horizontal location in the virtual space. It should be noted that the user's operation input for displaying the upward movement scene of the player character PC again corresponds to an example of a second condition.

In addition, in the present example, during game play in which the action control of the player character PC according to the user's operation input is allowed, a map image can be displayed with any timing desired by the user. For example, during that game play, a map image for at least one of a ground map and airspace map that include an area corresponding to a field where the player character PC is located is displayed according to the user's predetermined instruction operation input (e.g., a map display switching operation input of pressing the minus button 47 of the left controller 3). In addition, in the map displaying, maps to be displayed can be switched according to the user's operation input for switching maps between a ground map and an airspace map (e.g., a map switching operation input of pressing down the upper button 35 or the lower button 34 of the left controller 3). It should be noted that in the map displaying, a ground map and an airspace map are displayed with predetermined map information included in an area for which map information thereof is unlocked (e.g., detailed map information is shown), and with predetermined map information not included in an area for which map information thereof is locked (e.g., with detailed map information not shown).

It should be noted that a map image that is first displayed when the user's instruction operation input for performing the map displaying is performed may display a map of a field where the player character PC is located. For example, when the player character PC is located on a ground field of less than a predetermined height in the virtual space, a ground map indicating the ground field is first displayed together with a current location C indicating that location after the start of displaying of a map image. In addition, when the player character PC is located in an airspace field of the predetermined height or higher in the virtual space, an airspace map indicating the airspace field is first displayed together with a current location C indicating that location after the start of displaying a map image. By providing such a map image first displayed as a map of a field where the player character PC is located, that field where the player character PC is located can be more easily recognized by the user. In addition, a map of a field where the player character PC is located can be displayed without the user switching maps between a ground map and an airspace map.

In addition, in the present example, when the user performs an instruction operation input for choosing a label indicating a construction or the like in an unlocked area displayed in a ground map during the displaying of a map image, the player character PC can be moved automatically (i.e., without the user's movement operation input for the player character PC) from the current location in the virtual space to a location in the virtual space corresponding to the label. For example, when the user performs, on a displayed ground map, an instruction operation input for choosing a label M indicating a specific building for which the above upward movement scene for unlocking map information has been displayed, the player character PC can be moved to a location (e.g., the inside or surroundings of the specific building) in the virtual space corresponding to the label M by warp drive (e.g., an instantaneous movement to the corresponding location). Thus, in the present example, after unlocking of map information, the player character PC can be moved by warp drive to the inside or surroundings of a specific building used in unlocking of map information no matter where the player character PC is located. In addition, as described above, the player character PC can also be moved upward from the inside of the specific building to the movement target location MT again, and therefore, the specific building can serve as a base for both of a ground field and an airspace field, whereby the fields can be more easily explored.

In addition, in the present example, in the virtual space, the player character PC can be moved to three or more layers of fields instead of the above two layers of fields, i.e., a ground field and an airspace field. In that case, in unlocking of map information and displaying of a map image, map information of the three or more layers of fields may be unlocked so that a map image for each field can be displayed. As an example, in addition to the above two layers, i.e., a ground field and an airspace field, an underground field that is set below the surface of the earth in the virtual space, an underwater field that is set below the surface of the water in the virtual space, an outer-space field that is set higher than an airspace field in the virtual space, and the like may be provided, for which unlocking of map information and displaying of a map image may be performed as described above.

In the above example, the action of unlocking map information is allowed in a specific building provided on a ground field. In addition or alternatively, the action of unlocking map information may be allowed in other fields, i.e., the action of unlocking map information may be allowed in a plurality of fields.

Figure 19:
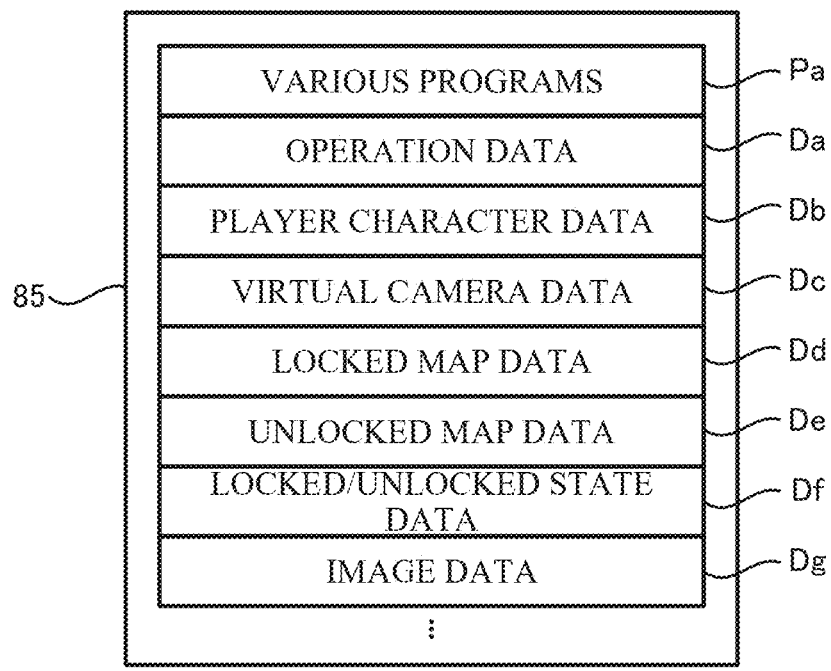
FIG. 19 is a diagram illustrating a non-limiting example of a data area set in a DRAM 85 of a main body apparatus 2.

Next, a specific example of the process executed in the game system 1 will be described with reference to FIG. 19. FIG. 19 is a diagram illustrating an example of a data area set in the DRAM 85 of the main body apparatus 2. It should be noted that the DRAM 85 also stores data used in other processes in addition to the data of FIG. 19, and those data will not be described in detail.

Various programs Pa that are executed in the game system 1 are stored in a program storage area of the DRAM 85. In the present example, the programs Pa include an application program (e.g., a game program) for performing information processing based on data obtained from the left controller 3 and/or the right controller 4, and the main body apparatus 2. Note that the programs Pa may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs Pa stored in the DRAM 85.

Various kinds of data that are used in processes such as an information process that are executed in the game system 1 are stored in a data storage area of the DRAM 85. In the present example, the DRAM 85 stores operation data Da, player character data Db, virtual camera data Dc, locked map data Dd, unlocked map data De, locked/unlocked state data Df, image data Dg, and the like.

The operation data Da is obtained, as appropriate, from each of the left controller 3 and/or the right controller 4 and the main body apparatus 2. As described above, the operation data obtained from each of the left controller 3 and/or the right controller 4 and the main body apparatus 2 includes information about an input from each input section (specifically, each button, an analog stick, or a touch panel) (specifically, information about an operation). In the present example, operation data is obtained from each of the left controller 3 and/or the right controller 4 and the main body apparatus 2. The obtained operation data is used to update the operation data Da as appropriate. Note that the operation data Da may be updated for each frame that is the cycle of a process executed in the game system 1, or may be updated each time operation data is obtained.

The player character data Db indicates the place, direction, and position of the player character PC disposed in the virtual space, the movement and state in the virtual space of the player character PC, and the like.

The virtual camera data Dc indicates the location, direction, angle of view, and the like of a virtual camera disposed in the virtual space.

The locked map data Dd indicates, for each area, a ground map and an airspace map for which map information thereof is locked. The unlocked map data De indicates, for each area, a ground map and an airspace map for which map information thereof is unlocked.

The locked/unlocked state data Df indicates whether map information of each area on a ground field and an airspace field is locked or unlocked.

The image data Dg is used to display, on a display screen (e.g., the display 12 of the main body apparatus 2), images (e.g., an image of the player character PC, images of other characters, images of virtual objects, an image of a field in the virtual space, a map image, and a background image).

Figure 20:
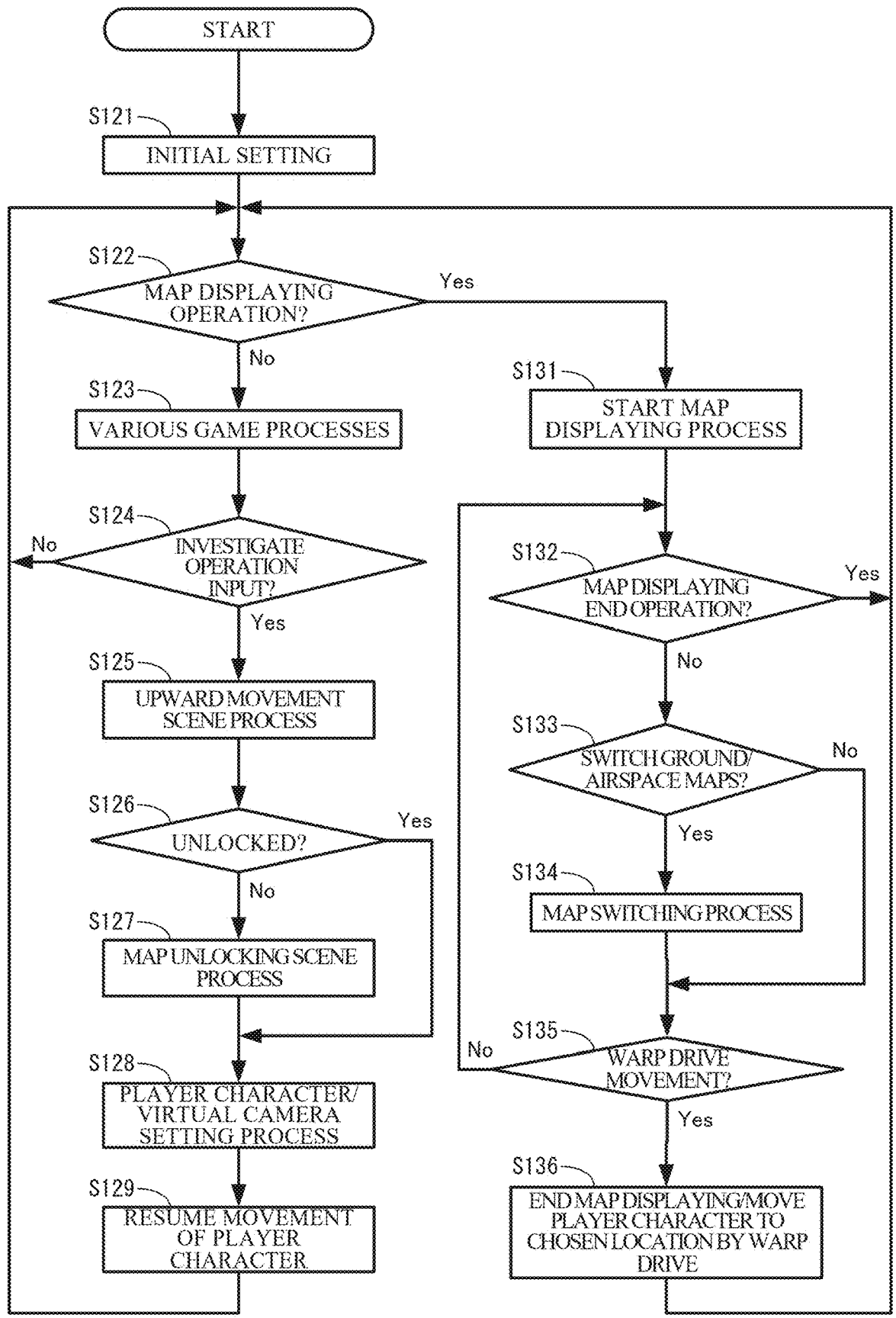
FIG. 20 is a flowchart illustrating a non-limiting example of a game process executed in a game system 1.

Next, a detailed example of a game process that is an example of an information process of the present example will be described with reference to FIG. 20. FIG. 20 is a flowchart illustrating an example of a game process executed in the game system 1. In the present example, a series of steps illustrated in FIG. 20 are executed by the processor 81 executing a predetermined application program (game program) included the programs Pa. The game process of FIG. 20 is started with any appropriate timing. It should be noted that during execution of a game process or the like, operation data is obtained for each frame (i.e., at predetermined time intervals), and each object in the virtual space is controlled, an image is displayed, and the like, based on the operation data Da, and a game process is executed as described below.

It should be noted that the steps in the flowchart of FIG. 20, which are merely illustrative, may be executed in a different order, or another step may be executed in addition to (or instead of) each step, if a similar effect is obtained. In the present example, it is assumed that the processor 81 executes each step of the flowchart. Alternatively, a portion of the steps of the flowchart may be executed by a processor or dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 via a network). Specifically, the steps of FIG. 20 may be executed by a plurality of information processing apparatuses including the main body apparatus 2 cooperating with each other.

In FIG. 20, the processor 81 performs initial setting for the game process (step S121), and proceeds to the next step. For example, in the initial setting, the processor 81 initializes parameters for performing steps described below, and updates each data. As an example, the processor 81 disposes a virtual object, other characters, and the like on a ground field and an airspace field in the virtual space to generate the initial state of the virtual space. Thereafter, the processor 81 disposes a player character PC adopting a predetermined position and a virtual camera having a predetermined orientation at default locations in the virtual space in the initial state, and updates the player character data Db and the virtual camera data Dc. In addition, the processor 81 updates the locked/unlocked state data Df, depending on the locked/unlocked state of map information of each area on the ground field and the airspace field in the virtual space (e.g., all areas are set "locked" at the beginning of a game, or each area is set "locked" or unlocked" that was taken before interruption of a game, based on saved data and the like, when the game is resumed from a halfway point).

Next, the processor 81 determines whether or not a map displaying operation has been performed (step S122). For example, if the operation data Da indicates the user's operation input for starting map displaying control (e.g., a map display switching operation input of pressing down the minus button 47 of the left controller 3), the result of the determination by the processor 81 in step S122 is positive. If the map displaying operation has not been performed, the processor 81 proceeds to step S123. Otherwise, i.e., if the map displaying operation has been performed, the processor 81 proceeds to step S131.

In step S123, the processor 81 performs various game processes, and proceeds to the next step. For example, the processor 81 sets an action of the player character PC, based on the operation data Da. As an example, the processor 81 sets the place, direction, position, action, state, and the like of the player character PC, based on an operation input indicted by the operation data Da, virtual physical calculation (e.g., Newton's first law and Newton's law of universal gravitation) in the virtual space, and the like, and updates the player character data Db. As an example, when the player character PC is falling and moving in the virtual space, the processor 81 causes the player character PC to fall and move downward according to the physical laws of the virtual space while moving in the horizontal direction in the virtual space according to the user's movement operation input, based on the fall state of the player character PC. In addition, the processor 81 performs various game processes based on an action of the player character PC. As an example, the processor 81 sets the location and direction of the virtual camera such that the player character PC is disposed in the range of view of the virtual camera, and updates the virtual camera data Dc.

It should be noted that in the various game processes, a mini-map image is displayed, overlaying a map image, depending on a game situation. For example, if the player character PC is located on a ground field, the processor 81 sets a portion of a ground map image that surrounds the location (current location C) of the player character PC, as a mini-map image (e.g., the mini-map image MM of FIG. 18). In addition, if the player character PC is located in an airspace field, the processor 81 sets a portion of an airspace map image that surrounds the location (current location C) of the player character PC, as a mini-map image (e.g., the mini-map image MM of FIG. 17). Here, a ground map image is generated by assigning each unlocked ground area indicated by the locked/unlocked state data Df an unlocked ground map image of that ground area indicated by the unlocked map data De, assigning each locked ground area indicated by the locked/unlocked state data Df a locked ground map image of that ground area indicated by the locked map data Dd, and combining the map images of the ground areas. In addition, an airspace map image is generated by assigning each unlocked airspace area indicated by the locked/unlocked state data Df an unlocked airspace map image of that airspace area indicated by the unlocked map data De, assigning each locked airspace area indicated by the locked/unlocked state data Df a locked airspace map image of that airspace area indicated by the locked map data Dd, and combining the map images of the airspace areas.

In addition, in the various game processes, in the case in which only a portion of information is partially shown in an area for which map information thereof is locked, the locked map data Dd may be updated such that the information is displayed at the time when the information is revealed. For example, in the case in which information about constructions, roads, and the like that the player character PC has visited before the current time is displayed even for an area for which map information thereof is locked, when the player character PC newly visits another construction or road in step S123, the locked map data Dd may be updated such that map information (installation/construction information) thereof is displayed.

Next, the processor 81 determines whether or not the user's operation input for choosing the "investigate" command has been performed (step S124). Here, as described above, the user's operation input for choosing the "investigate" command is for causing the player character PC to perform an action of moving upward from a specific building to an airspace field. If the operation data Da indicates the user's operation input for choosing the "investigate" command, the result of the determination in step S124 is positive. If the user's operation input for choosing the "investigate" command has been performed, the processor 81 proceeds to step S125. Otherwise, i.e., if the user's operation input for choosing the "investigate" command has not been performed, the processor 81 returns to and repeats step S122.

In step S125, the processor 81 performs an upward movement scene process that causes the player character PC to move upward from the inside of the specific building toward the movement target location MT, and proceeds to the next step. For example, the processor 81 displays an upward movement scene in which the player character PC is moved upward, by displaying a series of animations indicating that after the player character PC moves onto the movement start stage MS in the specific building, the player character PC moves vertically upward and toward the movement target location MT in an airspace field, continuously on a frame-by-frame basis.

Next, the processor 81 determines whether or not map information of a current area in a map corresponding to a field where the player character PC is located is unlocked (step S126). For example, the result of the determination by the processor 81 in step S126 based on the locked/unlocked state data Df is negative if map information of an airspace area in an airspace map corresponding to the movement target location MT reached due to the upward movement scene in the airspace field is locked, or if map information of a ground area in a ground map corresponding to a location on a ground field directly below the movement target location MT is locked. If map information of the current area in the map is locked, the processor 81 proceeds to step S127. Otherwise, i.e., if map information of the current area in the map is already unlocked, the processor 81 proceeds to step S128.

In step S127, the processor 81 performs a map unlocking scene process, and proceeds to step S128. In the map unlocking scene process, the processor 81 sets, to the unlocked state, the locked/unlocked state of map information of an airspace area in an airspace map corresponding to the movement target location MT reached due to the upward movement scene in the airspace field and a ground area in a ground map corresponding to a location on a ground field directly below the movement target location MT, and updates the locked/unlocked state data Df.

Thereafter, the processor 81 displays a map unlocking scene. For example, for the area set to the unlocked state, the processor 81 displays a map unlocking scene that notifies that map information of that area has been unlocked. As an example, if map information of a ground area in a ground map corresponding to a ground field directly below the movement target location MT reached in the upward movement scene and an airspace area in an airspace map corresponding to the movement target location MT in an airspace field has been unlocked, the processor 81 starts an animation process for displaying a scene indicating the airspace map showing detailed map information in the region of the airspace area after displaying a scene indicating a ground map showing detailed map information in the region of the ground area, as described with reference to FIGS. 12 and 13. Thereafter, the processor 81 causes the map unlocking scene to proceed by continuously displaying the animation on a frame-by-frame basis.

In step S128, the processor 81 performs a process of setting the player character PC and the virtual camera, and proceeds to the next step. For example, when the game play is resumed after the end of the above animation, the player character PC starts moving from the movement target location MT. The processor 81 sets the place and position of the player character PC that are taken when the player character PC starts moving, and the location and direction of the virtual camera. Specifically, the processor 81 disposes the player character PC at the movement target location MT reached in step S125, sets the player character PC to a skydiving falling position, and updates the player character data Db. In addition, the processor 81 sets the location and direction of the virtual camera such that the player character PC is disposed in the range of view from above the player character PC (more specifically, an upper portion in a game space), and updates the virtual camera data Dc.

Next, the processor 81 resumes movement of the player character PC (step S129), and returns to and repeats step S122. For example, the processor 81 causes the player character PC to start a falling movement from the movement target location MT in the skydiving fall state, and causes the virtual camera to point downward from above the player character PC in the virtual space and follow the falling movement of the player character PC.

If, in step S122, the processor 81 determines that the map displaying operation has been performed, the processor 81 starts a map displaying process (step S131), and proceeds to the next step. For example, control is started to display a map image of a field where the player character PC is located. As an example, if the player character PC is located on a ground field, the processor 81 generates a map image to be displayed, by assigning an unlocked ground area indicated by the locked/unlocked state data Df an unlocked ground map image of that ground area indicated by the unlocked map data De, assigning a locked ground area indicated by the locked/unlocked state data Df a locked ground map image of that ground area indicated by the locked map data Dd, and combining the map images of the ground areas. Thereafter, the processor 81 starts control to put a label indicating a current location C on top of the map image, based on the location of the player character PC indicated by the player character data Db, and display the map image (e.g., see FIG. 14). As another example, if the player character PC is located in an airspace field, the processor 81 generates a map image to be displayed, by assigning an unlocked airspace area indicated by the locked/unlocked state data Df an unlocked airspace map image of that airspace area indicated by the unlocked map data De, assigning a locked airspace area indicated by the locked/unlocked state data Df a locked airspace map image of that airspace area indicated by the locked map data Dd, and combining the map images of the airspace areas. Thereafter, the processor 81 starts control to put a label indicating a current location C on top of the map image, based on the location of the player character PC indicated by the player character data Db, and display the map image (see, for example, FIG. 15).

Next, the processor 81 determines whether or not an operation of ending map displaying has been performed (step S132). For example, if the operation data Da indicates the user's operation input for ending map displaying, the result of the determination by the processor 81 in step S132 is positive. If the operation of ending map displaying has not been performed, the processor 81 proceeds to step S133. Otherwise, i.e., if the operation of ending map displaying has been performed, the processor 81 closes the map displaying to end the map displaying process, starts control to display an image showing a field where the player character PC is located, and returns to and repeats step S122. It should be noted that in step S132, even if the operation of ending map displaying has not been performed, the processor 81 may provide the positive result after a predetermined period of time has passed since the start of the map displaying, and end the map displaying process.

In step S133, the processor 81 determines whether or not an operation of switching maps has been performed. For example, if the operation data Da indicates an operation input for switching maps between a ground map and an airspace map (e.g., a map switching operation input of pressing down the up button 35 or down button 34 of the left controller 3), the result of the determination by the processor 81 in step S133 is positive. If the switching operation has been performed, the processor 81 proceeds to step S134. Otherwise, i.e., if the switching operation has not been performed, the processor 81 proceeds to step S135.

In step S134, the processor 81 performs a process of switching fields of a displayed map and displaying the chosen field, and proceeds to step S135. For example, the processor 81 performs control to display a map image of a field to be displayed according to the operation input for switching maps. It should be noted that the process of generating a map image of each field is similar to the process of performing map displaying in step S131, and therefore, will not be described in detailed.

In step S135, the processor 81 determines whether or not to move the player character PC to a location based on the map image by warp drive. For example, if the operation data Da indicates the user's instruction operation input for choosing a label for a construction or the like in an unlocked area in a displayed ground map image or airspace map image, the result of the determination by the processor 81 in step S135 is positive. If the processor 81 determines to move the player character PC by warp drive, the processor 81 proceeds to step S136. Otherwise, i.e., if the processor 81 determines not to move the player character PC by warp drive, the processor 81 returns to and repeats step S132.

In step S136, the processor 81 moves the player character PC to a location in the virtual space corresponding to the chosen mark by warp drive, closes the map displaying to end the map displaying process, and returns to and repeats step S122. For example, the processor 81 closes the displayed map image, and starts control to display an image showing a field where the player character PC is located. Thereafter, the processor 81 moves the player character PC to a location in the virtual space corresponding to a mark on the map image chosen by the operation input (e.g., the inside or surroundings of the construction) by warp drive, sets the player character PC to a predetermined position after the warp drive, and updates the player character data Db.

Thus, in the present example, map information of a ground area corresponding to a ground field where a specific building is provided and an airspace area corresponding to an airspace above the specific building is unlocked, and movement from the airspace field to the ground field based on the user's operation is resumed after moving the player character PC upward from the ground field to the airspace field. As a result, the user can more easily explore from an airspace field to a ground field while using a ground map of the ground field and an airspace map of the airspace field.

It should be noted that the present example employs a game in which a virtual space includes two or more layers of fields including a ground field and an airspace field, and the player character PC explores the virtual space while moving from the airspace field to the ground field based on physical laws used in the game. The present example may also employ a game in which the player character PC explores a virtual space having another field configuration, provided that the virtual space includes two or more layers of fields. As a first example, the ground field in the present example encompasses a sea-surface field on the surface of the sea. Even in the case in which a virtual space includes two or more layers of fields including a sea-surface field and an airspace field, a similar effect can be expected. As a second example, the airspace field in the present example may encompass outer space (space beyond the atmosphere) in a virtual space. Even in the case in which a virtual space includes two or more layers of fields including a ground field and an airspace field including outer space, a similar effect can be expected. As a third example, a virtual space may include an undersea field below the surface of the sea and a sea-surface field on the surface of the sea. In that case, after the player character PC is caused to dive and move down from the sea-surface field to the undersea field when map information is unlocked, movement control based on the user's operation to cause the player character PC to rise from the undersea field to the sea-surface field is resumed. Thus, even for a game in which the player character PC explores a virtual space while rising from the undersea field to the sea-surface field based on buoyancy used in the game, a similar effect can be expected.

The game system 1 may be any suitable apparatus, including a handheld game apparatus, or any suitable handheld electronic apparatus (a personal digital assistant (PDA), mobile telephone, personal computer, camera, tablet computer, etc.), etc.

In the foregoing, the information processes (game processes) are performed in the game system 1. Alternatively, at least a portion of the process steps may be performed in another apparatus. For example, when the game system 1 can also communicate with another apparatus (e.g., a server, another information processing apparatus, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above example, the information processes can be performed by the processor 81 of the game system 1 executing predetermined programs. Alternatively, all or a portion of the above processes may be performed by a dedicated circuit included in the game system 1.

Here, according to the above variation, the present example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the above steps may be performed by substantially any of the apparatuses, and the present example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement the present example.

The above programs may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of the present example and common technical knowledge. It should be understood throughout the present specification that expression of a singular form includes the concept of its plurality unless otherwise mentioned. Specifically, articles or adjectives for a singular form (e.g., "a", "an", "the", etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which the present example pertain. If there is any inconsistency or conflict, the present specification (including the definitions) shall prevail.

As described above, the present example is applicable as a game program, game system, game apparatus, game processing method, and the like that enable a player character to more easily explore a virtual space.

What is claimed is:

1. A non-transitory computer-readable storage medium having stored therein a game program that when executed by a computer of an information processing apparatus, causes the computer to perform operations comprising:
   performing movement control of a player character in a virtual space including a ground field and an airspace field above the ground field, based on a user's movement operation input;
   displaying a map image for at least one of a ground map divided into a plurality of ground areas and indicating map information of the ground field and an airspace map divided into a plurality of airspace areas and indicating map information of the airspace field, based on a map image of an area in a first state including map information or a map image of an area in a second state not including the map information, according to the user's instruction operation input;

when a first condition is satisfied at a first location on the ground field of a first ground area, changing the ground map of the first ground area and the airspace map of a first airspace area above the first location, from the second state to the first state; and when the first condition is satisfied, moving the player character from the first location to a second location in the airspace field of the first airspace area, and resuming the movement control based on the user's movement operation input after the movement to the second location.

2. The non-transitory computer-readable storage medium according to claim 1, wherein
the game program further causes the computer to perform operations comprising:
in a situation after the player character is moved from the first location to the second location, displaying a scene in which a ground map image of the first ground area in the first state and an airspace map image of the first airspace area in the first state are displayed, thereby allowing displaying of the first ground area and the first airspace area based on the map images in the first state; and
resuming the movement control based on the movement operation input after end of the situation.

3. The non-transitory computer-readable storage medium according to claim 1, wherein
virtual gravity is set from an upward direction to a downward direction in the virtual space; and
in the movement control after the resuming, the player character is moved in the downward direction based on the gravity, and is moved in a direction based on the user's movement operation input.

4. The non-transitory computer-readable storage medium according to claim 3, wherein
the second location is directly above the first location in the virtual space.

5. The non-transitory computer-readable storage medium according to claim 4, wherein
the game program further causes the computer to perform operations comprising:
when the movement control is performed after the resuming, setting an imaging direction of a virtual camera to a direction pointing from the airspace field toward the ground field, and further displaying an image indicating the virtual space as viewed from the virtual camera.

6. The non-transitory computer-readable storage medium according to claim 5, wherein
one or more airspace field objects on which the player character is allowed to land are disposed in the airspace field of the first airspace area, and
a height of the second location is higher than a height of at least one of the one or more airspace field objects in the virtual space.

7. The non-transitory computer-readable storage medium according to claim 1, wherein
the game program further causes the computer to perform operations comprising:
if the ground map of the first ground area and the airspace map of the first airspace area have been changed into the first state, then when a second condition is satisfied at the first location, moving the player character from the first location to the second location again, and resuming the movement control based on the user's movement operation input after the movement to the second location.

8. The non-transitory computer-readable storage medium according to claim 7, wherein
the game program further causes the computer to perform operations comprising:
when, during displaying of the map image, an instruction operation input for choosing a mark indicating the first location on the ground map is performed, moving the player character to a location in the virtual space indicted by the chosen mark.

9. The non-transitory computer-readable storage medium according to claim 1, wherein
the game program further causes the computer to perform operations comprising:
when a player character for which the movement control is allowed is located at a height or higher in the virtual space, displaying a portion of an image of the airspace map, or an image of the airspace map as a map image that is first displayed after start of displaying of the map image; and
when a player character for which the movement control is allowed is located at less than the height in the virtual space, displaying a portion of an image of the ground map, or an image of the ground map as a map image that is first displayed after start of displaying of the map image.

10. A game system comprising a processor, the processor being configured to at least:
perform movement control of a player character in a virtual space including a ground field and an airspace field above the ground field, based on a user's movement operation input;
display a map image for at least one of a ground map divided into a plurality of ground areas and indicating map information of the ground field and an airspace map divided into a plurality of airspace areas and indicating map information of the airspace field, based on a map image of an area in a first state including map information or a map image of an area in a second state not including the map information, according to the user's instruction operation input;
when a first condition is satisfied at a first location on the ground field of a first ground area, change the ground map of the first ground area and the airspace map of a first airspace area above the first location, from the second state to the first state; and
when the first condition is satisfied, move the player character from the first location to a second location in the airspace field of the first airspace area, and resume the movement control based on the user's movement operation input after the movement to the second location.

11. The game system according to claim 10, wherein
the processor is further configured to at least:
in a situation after the player character is moved from the first location to the second location, display a scene in which a ground map image of the first ground area in the first state and an airspace map image of the first airspace area in the first state are displayed, thereby allowing displaying of the first ground area and the first airspace area based on the map images in the first state; and resume the movement control based on the movement operation input after end of the situation.

12. The game system according to claim 10, wherein
virtual gravity is set from an upward direction to a downward direction in the virtual space; and
in the movement control after the resuming, the player character is moved in the downward direction based on the gravity, and is moved in a direction based on the user's movement operation input.

13. The game system according to claim 12, wherein
the second location is directly above the first location in the virtual space.

14. The game system according to claim 13, wherein
the process is further configured to at least:
when the movement control is performed after the resuming, set an imaging direction of a virtual camera to a direction pointing from the airspace field toward the ground field, and further display an image indicating the virtual space as viewed from the virtual camera.

15. The game system according to claim 14, wherein
one or more airspace field objects on which the player character is allowed to land are disposed in the airspace field of the first airspace area, and
a height of the second location is higher than a height of at least one of the one or more airspace field objects in the virtual space.

16. The game system according to claim 10, wherein
the processor is further configured to at least:
if the ground map of the first ground area and the airspace map of the first airspace area have been changed into the first state, then when a second condition is satisfied at the first location, move the player character from the first location to the second location again, and resume the movement control based on the user's movement operation input after the movement to the second location.

17. The game system according to claim 16, wherein
the processor is further configured to at least:
when, during displaying of the map image, an instruction operation input for choosing a mark indicating the first location on the ground map is performed, move the player character to a location in the virtual space indicted by the chosen mark.

18. The game system according to claim 10, wherein
the processor is further configured to at least:
when a player character for which the movement control is allowed is located at a height or higher in the virtual space, display a portion of an image of the airspace map, or an image of the airspace map as a map image that is first displayed after start of displaying of the map image; and
when a player character for which the movement control is allowed is located at less than the height in the virtual space, display a portion of an image of the ground map, or an image of the ground map as a map image that is first displayed after start of displaying of the map image.

19. A game apparatus comprising a processor, the processor being configured to at least:
perform movement control of a player character in a virtual space including a ground field and an airspace field above the ground field, based on a user's movement operation input;
display a map image for at least one of a ground map divided into a plurality of ground areas and indicating map information of the ground field and an airspace map divided into a plurality of airspace areas and indicating map information of the airspace field, based on a map image of an area in a first state including map information or a map image of an area in a second state not including the map information, according to the user's instruction operation input;
when a first condition is satisfied at a first location on the ground field of a first ground area, change the ground map of the first ground area and the airspace map of a first airspace area above the first location, from the second state to the first state; and
when the first condition is satisfied, move the player character from the first location to a second location in the airspace field of the first airspace area, and resume the movement control based on the user's movement operation input after the movement to the second location.

20. A game processing method for causing a processor of an information processing apparatus to at least:
perform movement control of a player character in a virtual space including a ground field and an airspace field above the ground field, based on a user's movement operation input;
display a map image for at least one of a ground map divided into a plurality of ground areas and indicating map information of the ground field and an airspace map divided into a plurality of airspace areas and indicating map information of the airspace field, based on a map image of an area in a first state including map information or a map image of an area in a second state not including the map information, according to the user's instruction operation input;
when a first condition is satisfied at a first location on the ground field of a first ground area, change the ground map of the first ground area and the airspace map of a first airspace area above the first location, from the second state to the first state; and
when the first condition is satisfied, move the player character from the first location to a second location in the airspace field of the first airspace area, and resume the movement control based on the user's movement operation input after the movement to the second location.

* * * * *